United States Patent
Kawaguchi et al.

(10) Patent No.: US 8,355,632 B2
(45) Date of Patent: Jan. 15, 2013

(54) TRANSMISSION APPARATUS

(75) Inventors: Mitsuhiro Kawaguchi, Kawasaki (JP);
Shosaku Yamasaki, Kawasaki (JP);
Shigeo Tani, Kawasaki (JP); Hideki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/656,241

(22) Filed: Jan. 21, 2010

(65) Prior Publication Data
US 2010/0124416 A1 May 20, 2010

Related U.S. Application Data

(63) Continuation of application No. PCT/JP2007/065868, filed on Aug. 14, 2007.

(51) Int. Cl.
*H04J 14/00* (2006.01)
*H04B 10/00* (2006.01)
*H04B 14/00* (2006.01)

(52) U.S. Cl. .................. 398/45; 398/2; 398/57
(58) Field of Classification Search .............. 398/2, 45, 398/9
See application file for complete search history.

(56) References Cited

U.S. PATENT DOCUMENTS

| | | | |
|---|---|---|---|
| 6,977,889 B1 * | 12/2005 | Kawaguchi et al. | 370/228 |
| 7,272,116 B1 * | 9/2007 | Houchen | 370/258 |
| 7,443,843 B2 * | 10/2008 | Matsuo et al. | 370/386 |
| 2005/0180410 A1 * | 8/2005 | Pepenella | 370/386 |
| 2005/0195864 A1 | 9/2005 | Matsuo et al. | |
| 2006/0098660 A1 * | 5/2006 | Pal et al. | 370/395.51 |
| 2008/0002706 A1 | 1/2008 | Hasegawa et al. | |

FOREIGN PATENT DOCUMENTS

| | | |
|---|---|---|
| JP | 10-93480 | 4/1998 |
| JP | 10-290249 | 10/1998 |
| JP | 2000-197167 | 7/2000 |
| JP | 2001-237794 | 8/2001 |
| JP | 2005-45573 | 2/2005 |
| JP | 2008-11136 | 1/2008 |
| WO | 2004/088929 A1 | 10/2004 |

OTHER PUBLICATIONS

International Search Report for PCT/JP2007/065868, mailed Nov. 13, 2007.

* cited by examiner

*Primary Examiner* — Kenneth N Vanderpuye
*Assistant Examiner* — Abbas H Alagheband
(74) *Attorney, Agent, or Firm* — Staas & Halsey LLP

(57) ABSTRACT

In a transmission apparatus, unlike in the conventional transmission apparatus, a protection switch is not arranged on the signal path, but a TSI having only the basic function performs the function of the protection switch as a substitute, a processing unit to perform the switching function at a low rate is artificially constructed on a TSI, the switch process of SONET protection type is artificially executed by the TSI, and a signal for controlling the TSI function is further controlled thereby to realize the protection switch function. The logic of switching at the main signal rate in addition to the conventional TSI function is deleted.

7 Claims, 26 Drawing Sheets

FIG.4

| SLOT ID DATA | PORT ID DATA | ACM CODE GROUP DATA<br>ACM CODE (ch ID DATA) |
|---|---|---|
| S00001 | P00001 | 10001 |
| | | 10002 |
| | | 10003 |
| | | ⋮ |
| | P00002 | 20001 |
| | | 20002 |
| | | 20003 |
| | | ⋮ |
| ⋮ | ⋮ | ⋮ |

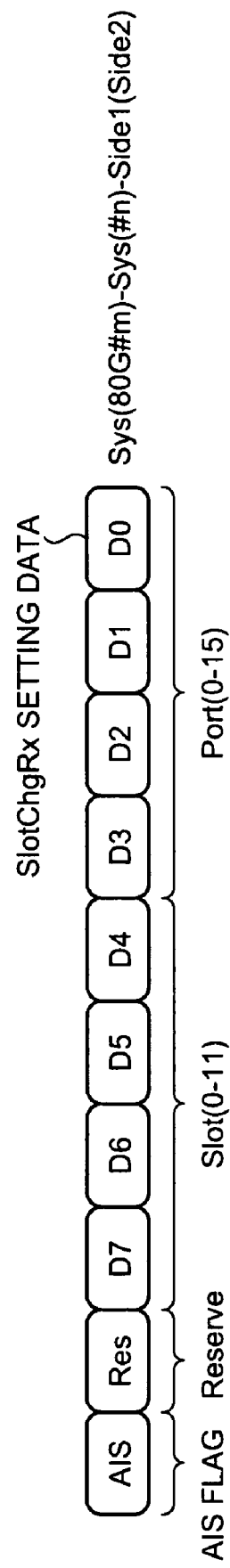

FIG.5B

| Slot Code Res, D5-0 | SELECT SLOT-Port |
|---|---|
| 'xxx000000' | SLOTa*4+1-Port0 |
| 'xxx000001' | SLOTa*4+1-Port1 |
| 'xxx000010' | SLOTa*4+1-Port2 |
| 'xxx000011' | SLOTa*4+1-Port3 |
| 'xxx000100' | SLOTa*4+1-Port4 |
| ⋮ | ⋮ |

FIG.6

OPERATION SYSTEM/SPARE SYSTEM SLOT CORRESPONDENCE DATA

| Case | SPARE SYSTEM Slot | OPERATION SYSTEM Slot |
|---|---|---|
| Case.1 | Slot1 | Slot2 TO 6 |
| Case.2 | Slot6 | Slot1 TO 5 |
| Case.1 | Slot7 | Slot8 TO 12 |
| Case.2 | Slot12 | Slot7 TO 11 |
| Case.1 | Slot13 | Slot14 TO 18 |
| Case.2 | Slot18 | Slot13 TO 17 |
| Case.1 | Slot19 | Slot20 TO 24 |
| Case.2 | Slot24 | Slot19 TO 23 |

FIG.10
(1) CONTROL BY SETTING SYS#(m)/#(m+4)-Side1 (m= 0, 1, 2, 3, 8, 9, A, C )
1. FOR BLSR SLOTSEL = "10" (OC768 2F-BLSR)
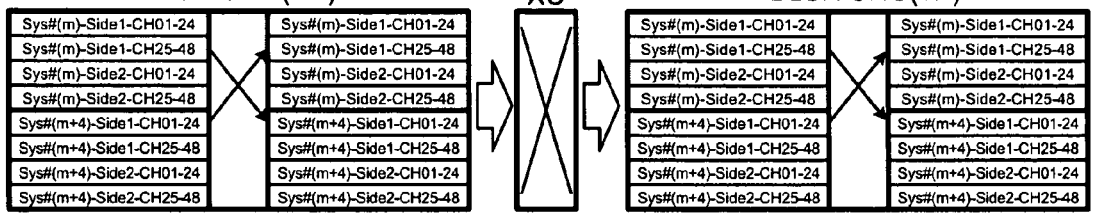
2. FOR BLSR SLOTSEL = "11" (OC192 4F-BLSR, OC768 4F-BLSR)
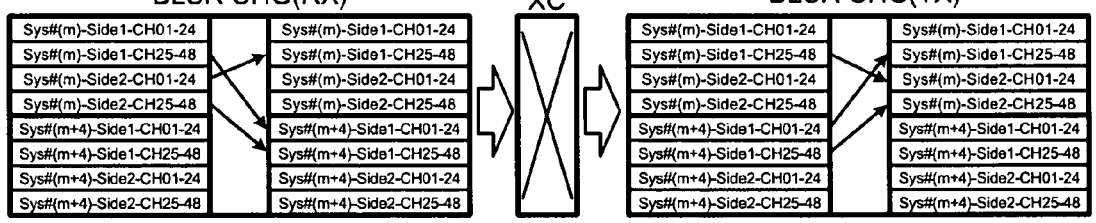
(2) CONTROL BY SETTING SYS#(m)/#(m+4)-Side2 (M = 0, 1, 2, 3, 8, 9, A, C)
1. FOR BLSR SLOTSEL = "10" (OC768 2F-BLSR)
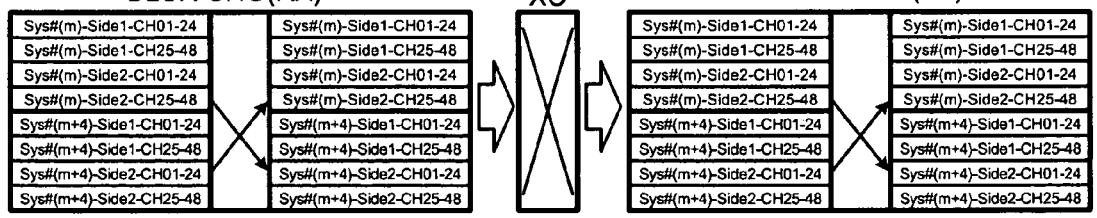
2. FOR BLSR SLOTSEL = "11" (OC192 4F-BLSR, OC768 4F-BLSR)
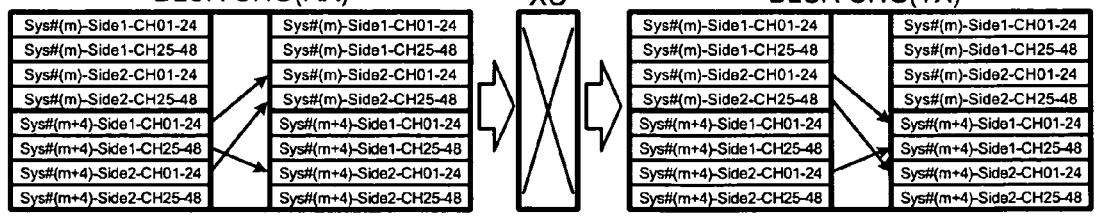

FIG.11

DTP CONVERSION TABLE

| SLOT TO BE CONVERTED | SLOT AFTER CONVERSION |
|---|---|
| Slot1 | Slot3 |
| Slot2 | Slot4 |
| ⋮ | ⋮ |

| Sys-SideCode Res ,D8-0 | SELECTED Sys-SideCode |
|---|---|
| 'XXX_0_00000' | Sys80G#0-Sys#0-Side1 |
| 'XXX_0_00001' | Sys80G#0-Sys#0-Side2 |
| 'XXX_0_00010' | Sys80G#0-Sys#1-Side1 |
| 'XXX_0_00011' | Sys80G#0-Sys#1-Side2 |
| 'XXX_0_00100' | Sys80G#0-Sys#2-Side1 |
| 'XXX_0_00101' | Sys80G#0-Sys#2-Side2 |
| 'XXX_0_00110' | Sys80G#0-Sys#3-Side1 |
| ⋮ | ⋮ |

FIG.19

| STANDARD | BLSR CHANGE CODE ("00"/"01") | |
| --- | --- | --- |
| | 1+1SEL (THROUGH) | 1+1SEL (PT SELECTED) |
| Sys#0-Side1-(ch01-24) | Sys#0-Side1-(ch01-24) | Sys#0-Side2-(ch01-24) |
| Sys#0-Side1-(ch25-48) | Sys#0-Side1-(ch25-48) | Sys#0-Side2-(ch25-48) |
| Sys#0-Side2-(ch01-24) | Sys#0-Side2-(ch01-24) | Sys#0-Side2-(ch01-24) |
| Sys#0-Side2-(ch25-48) | Sys#0-Side2-(ch25-48) | Sys#0-Side2-(ch25-48) |
| Sys#1-Side1-(ch01-24) | Sys#1-Side1-(ch01-24) | Sys#1-Side2-(ch01-24) |
| Sys#1-Side1-(ch25-48) | Sys#1-Side1-(ch25-48) | Sys#1-Side2-(ch25-48) |
| Sys#1-Side2-(ch01-24) | Sys#1-Side2-(ch01-24) | Sys#1-Side2-(ch01-24) |
| Sys#1-Side2-(ch25-48) | Sys#1-Side2-(ch25-48) | Sys#1-Side2-(ch25-48) |
| ⋮ | ⋮ | ⋮ |

FIG.20

| STANDARD | BLSR CHANGE CODE ("10") | |
| --- | --- | --- |
| | 1+1SEL (THROUGH) | 1+1SEL (PT SELECTED) |
| Sys#0-Side1-(ch01-24) | Sys#0-Side1-(ch01-24) | Sys#0-Side2-(ch01-24) |
| Sys#0-Side1-(ch25-48) | Sys#4-Side1-(ch01-24) | Sys#4-Side2-(ch01-24) |
| Sys#0-Side2-(ch01-24) | Sys#0-Side2-(ch01-24) | Sys#0-Side2-(ch01-24) |
| Sys#0-Side2-(ch25-48) | Sys#4-Side2-(ch01-24) | Sys#4-Side2-(ch01-24) |
| Sys#1-Side1-(ch01-24) | Sys#1-Side1-(ch01-24) | Sys#1-Side2-(ch01-24) |
| Sys#1-Side1-(ch25-48) | Sys#5-Side1-(ch01-24) | Sys#5-Side2-(ch01-24) |
| Sys#1-Side2-(ch01-24) | Sys#1-Side2-(ch01-24) | Sys#1-Side2-(ch01-24) |
| Sys#1-Side2-(ch25-48) | Sys#5-Side2-(ch01-24) | Sys#5-Side2-(ch01-24) |
| ⋮ | ⋮ | ⋮ |

FIG.21

| STANDARD | BLSR CHANGE CODE ("11") | |
| --- | --- | --- |
| | 1+1SEL (THROUGH) | 1+1SEL (PT SELECTED) |
| Sys#0-Side1-(ch01-24) | Sys#0-Side1-(ch01-24) | Sys#0-Side2-(ch01-24) |
| Sys#0-Side1-(ch25-48) | Sys#0-Side2-(ch01-24) | Sys#0-Side2-(ch01-24) |
| Sys#0-Side2-(ch01-24) | Sys#4-Side1-(ch01-24) | Sys#4-Side2-(ch01-24) |
| Sys#0-Side2-(ch25-48) | Sys#4-Side2-(ch01-24) | Sys#4-Side2-(ch01-24) |
| Sys#1-Side1-(ch01-24) | Sys#1-Side1-(ch01-24) | Sys#1-Side2-(ch01-24) |
| Sys#1-Side1-(ch25-48) | Sys#1-Side2-(ch01-24) | Sys#1-Side2-(ch01-24) |
| Sys#1-Side2-(ch01-24) | Sys#5-Side1-(ch01-24) | Sys#5-Side2-(ch01-24) |
| Sys#1-Side2-(ch25-48) | Sys#5-Side2-(ch01-24) | Sys#5-Side2-(ch01-24) |
| ⋮ | ⋮ | ⋮ |

FIG.22

| STANDARD | BLSR CHANGE CODE ("00"/"01") | |
| --- | --- | --- |
| | 1+1DIS (THROUGH) | 1+1DIS (PT SELECTED) |
| Sys#0-Side1-(ch01-24) | Sys#0-Side1-(ch01-24) | Sys#0-Side1-(ch01-24) |
| Sys#0-Side1-(ch25-48) | Sys#0-Side1-(ch25-48) | Sys#0-Side1-(ch25-48) |
| Sys#0-Side2-(ch01-24) | Sys#0-Side2-(ch01-24) | Sys#0-Side1-(ch01-24) |
| Sys#0-Side2-(ch25-48) | Sys#0-Side2-(ch25-48) | Sys#0-Side1-(ch25-48) |
| Sys#1-Side1-(ch01-24) | Sys#1-Side1-(ch01-24) | Sys#1-Side1-(ch01-24) |
| Sys#1-Side1-(ch25-48) | Sys#1-Side1-(ch25-48) | Sys#1-Side1-(ch25-48) |
| Sys#1-Side2-(ch01-24) | Sys#1-Side2-(ch01-24) | Sys#1-Side1-(ch01-24) |
| Sys#1-Side2-(ch25-48) | Sys#1-Side2-(ch25-48) | Sys#1-Side1-(ch25-48) |
| ⋮ | ⋮ | ⋮ |

FIG.23

| STANDARD | BLSR CHANGE CODE ("10") | |
|---|---|---|
| | 1+1DIS (THROUGH) | 1+1DIS (PT SELECTED) |
| Sys#0-Side1-(ch01-24) | Sys#0-Side1-(ch01-24) | Sys#0-Side1-(ch01-24) |
| Sys#0-Side1-(ch25-48) | Sys#4-Side1-(ch01-24) | Sys#4-Side1-(ch01-24) |
| Sys#0-Side2-(ch01-24) | Sys#0-Side2-(ch01-24) | Sys#0-Side1-(ch01-24) |
| Sys#0-Side2-(ch25-48) | Sys#4-Side2-(ch01-24) | Sys#4-Side1-(ch01-24) |
| Sys#1-Side1-(ch01-24) | Sys#1-Side1-(ch01-24) | Sys#1-Side1-(ch01-24) |
| Sys#1-Side1-(ch25-48) | Sys#5-Side1-(ch01-24) | Sys#5-Side1-(ch01-24) |
| Sys#1-Side2-(ch01-24) | Sys#1-Side2-(ch01-24) | Sys#1-Side1-(ch01-24) |
| Sys#1-Side2-(ch25-48) | Sys#5-Side2-(ch01-24) | Sys#5-Side1-(ch01-24) |
| ⋮ | ⋮ | ⋮ |

FIG.24

| STANDARD | BLSR CHANGE CODE ("11") | |
|---|---|---|
| | 1+1DIS (THROUGH) | 1+1DIS (PT SELECTED) |
| Sys#0-Side1-(ch01-24) | Sys#0-Side1-(ch01-24) | Sys#0-Side1-(ch01-24) |
| Sys#0-Side1-(ch25-48) | Sys#0-Side2-(ch01-24) | Sys#0-Side1-(ch01-24) |
| Sys#0-Side2-(ch01-24) | Sys#4-Side1-(ch01-24) | Sys#4-Side1-(ch01-24) |
| Sys#0-Side2-(ch25-48) | Sys#4-Side2-(ch01-24) | Sys#4-Side1-(ch01-24) |
| Sys#1-Side1-(ch01-24) | Sys#1-Side1-(ch01-24) | Sys#1-Side1-(ch01-24) |
| Sys#1-Side1-(ch25-48) | Sys#1-Side2-(ch01-24) | Sys#1-Side1-(ch01-24) |
| Sys#1-Side2-(ch01-24) | Sys#5-Side1-(ch01-24) | Sys#5-Side1-(ch01-24) |
| Sys#1-Side2-(ch25-48) | Sys#5-Side2-(ch01-24) | Sys#5-Side1-(ch01-24) |
| ⋮ | ⋮ | ⋮ |

FIG. 28
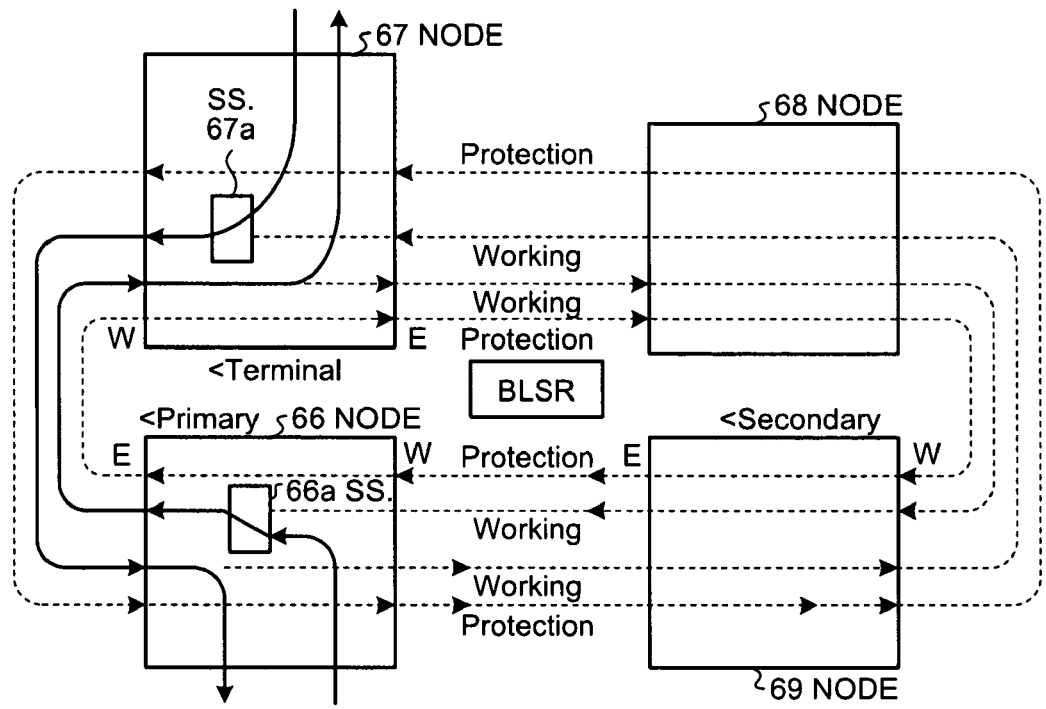
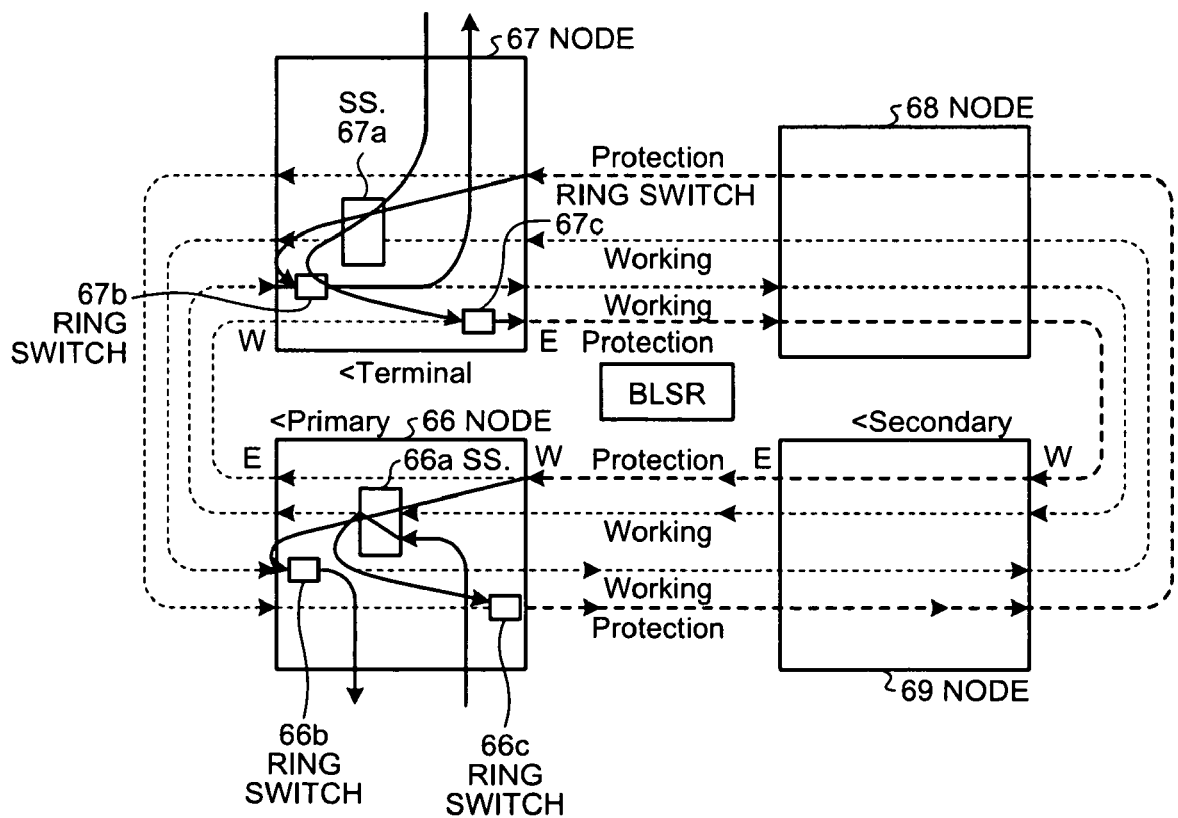

TRANSMISSION APPARATUS

CROSS-REFERENCE TO RELATED APPLICATION(S)

This application is a continuation of International Application No. PCT/JP2007/065868, filed on Aug. 14, 2007, the entire contents of which are incorporated herein by reference.

FIELD

The embodiment discussed herein is directed to a transmission apparatus for transmitting an optical signal by controlling a cross connect switch and thus switching a transmission path for the optical signal input from an optical network having a redundant configuration.

BACKGROUND

With a recent increase in transmission data, the speed and capacity of the transmission signal are ever on the increase. At the same time, optical transmission apparatuses are required to be equipped with switch fabrics having large-capacity TSI (Time Slot Interchange, or cross connect) functions.

Also, optical transmission apparatuses adapted for SONET (Synchronous Optical Network) or SDH (Synchronous Digital Hierarchy) use ring networks such as SONET rings to secure network reliability.

Ring network systems include UPSR (Unidirectional Path Switched Ring) and BLSR (Bidirectional Line Switched Ring) systems. Through such ring network systems, different optical transmission apparatuses on ring networks are relieved from a fault which may occur by a protection configuration using a redundant channel.

When such optical transmission apparatuses on ring networks set lines for digital multiplex transmission data, the time slots for the digital multiplex transmission data are allotted and thus channel positions for the digital multiplex transmission data are replaced.

Japanese Laid-open Patent Publication No. 2001-237794 discloses a technique in which upon occurrence of a fault in the traffic of the operation system, the traffic of the operation system can be switched independently of the traffic setting of the spare system or the activation of other APS (Automatic Protection Switch).

The above-mentioned conventional technique poses such problems, however, that the processing capacity required for line setting is remarkably increased when a measure is taken against a fault or various lines for the transmission data are set for the optical transmission apparatus making up the ring network, and the line setting process is required be to executed at a high speed, resulting in an increased size of the circuits to be included in the optical transmission apparatus.

SUMMARY

According to an aspect of an embodiment of the invention, a transmission apparatus includes a cross connect switch that switches a transmission path for an optical signal input from an optical network making up a redundant configuration and that includes an input slot to which the optical signal is input and an output slot from which the optical signal is output; a storage unit that stores input/output correspondence information where the input slot and the output slot are set in correspondence with each other in accordance with the redundant configuration; and a transmission path switching unit that switches the transmission path for the optical signal by setting the input slot and the output slot of the cross connect switch in correspondence with each other based on the input/output correspondence information stored in the storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an example of the data structure of an ACM code group data;

FIG. 5A is a diagram illustrating an example of a Slot Chg Rx setting data;

FIG. 5B is a diagram illustrating the numerical values input to D0 to Dy and the correspondence between the slots and the ports corresponding to the particular numerical values;

FIG. 6 is a diagram illustrating an example of the data structure of a receiving-side operation system/spare system slot correspondence data;

FIG. 10 is a diagram for explaining the outline of a BLSR switch processing unit;

FIG. 11 is a diagram illustrating an example of the data structure of a DTP conversion table;

FIG. 19 is a diagram (1) illustrating an example of an Rx-side conversion table;

FIG. 20 is a diagram (2) illustrating an example of an Rx-side conversion table;

FIG. 21 is a diagram (3) illustrating an example of an Rx-side conversion table;

FIG. 22 is a diagram (1) illustrating an example of a Tx-side conversion table;

FIG. 23 is a diagram (2) illustrating an example of a Tx-side conversion table;

FIG. 24 is a diagram (3) illustrating an example of a Tx-side conversion table;

FIG. 28 is a diagram for explaining a BLSR redundant configuration;

DESCRIPTION OF EMBODIMENT

A preferred embodiment of the present invention will be explained with reference to accompanying drawings. The present invention is not limited by the embodiment.

Embodiment

Figure 25:
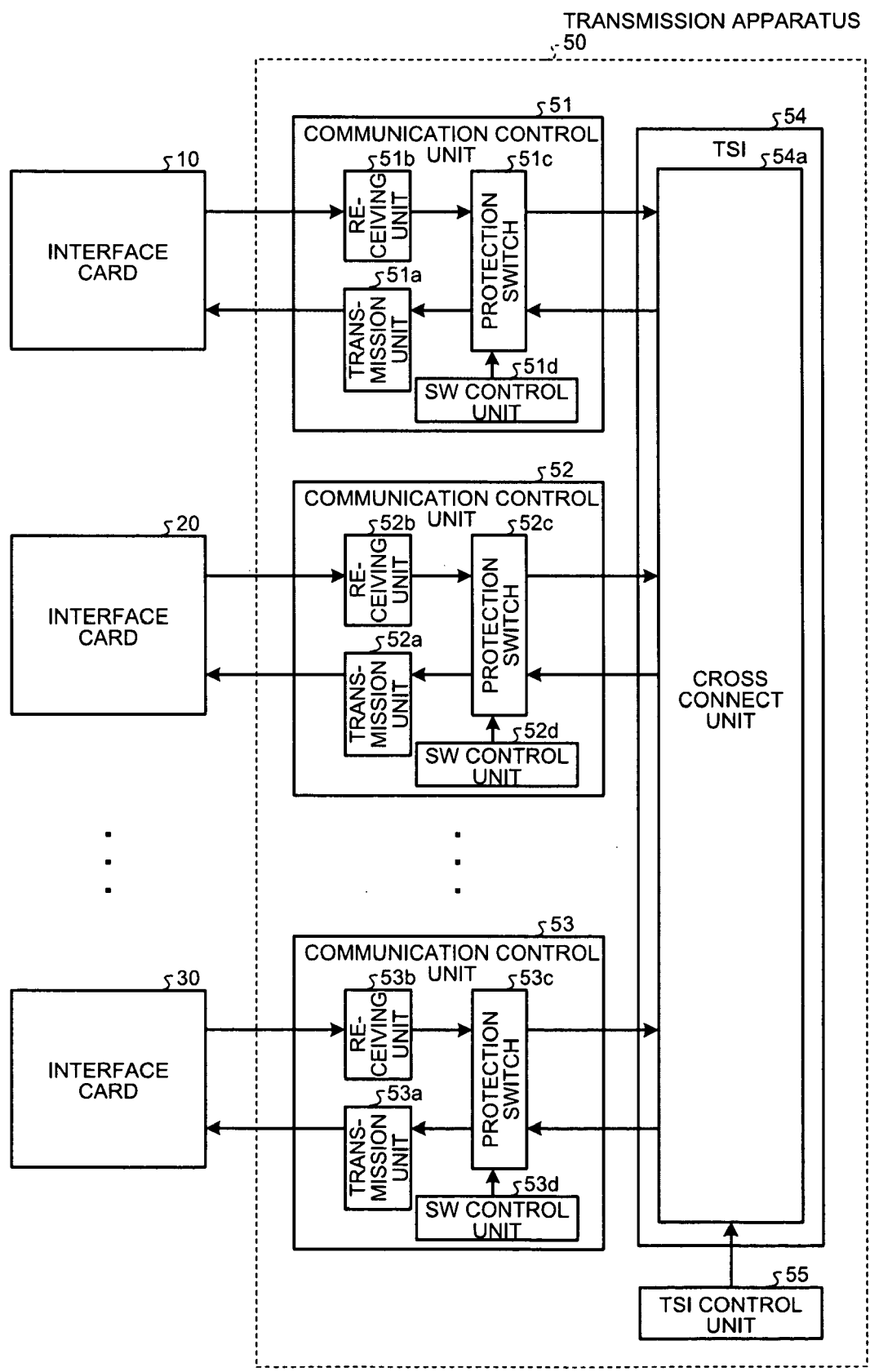
FIG. 25 is a diagram illustrating the configuration of the conventional transmission apparatus.

Prior to explanation of the embodiment, the configuration of the conventional transmission apparatus having the redundant function in an optical network is explained. FIG. 25 is a diagram illustrating the configuration of the conventional transmission apparatus. As illustrated in this drawing, a transmission apparatus 50 is configured of communication control units 51 to 53, a TSI (Time Slot Interchange) 54 and a TSI control unit 55. Also, the transmission apparatus 50 is connected to interface cards 10 to 30. The interface cards 10 to 30 are devices for data communication (data communication by the optical signal) with other transmission apparatuses connected on the optical network.

The communication control unit 51 is a processing unit for transmitting and receiving the data to and from the interface card 10 and the TSI 54 (the communication control units 52, 53 are similar to the communication control unit 51, and not described). Also, the communication control unit 51 has the protection switch function to switch the data transmission path to that of the spare system upon occurrence of a fault in the data transmission path (line) of the operation system.

The communication control unit 51, as illustrated in FIG. 25, includes a transmission unit 51a, a receiving unit 51b, a protection switch 51c and a SW control unit 51d. The transmission unit 51a is a processing unit for receiving the data from the TSI 54 and outputting the data to the interface card 10, and the receiving unit 51b is a processing unit for receiving the data from the interface card 10 and outputting the received data to the TSI 54.

The protection switch 51c is a processing unit for switching the data transmission path in response to the control information output from the. SW control unit 51d. The SW control unit 51d is a processing unit, which upon occurrence of a fault in the transmission path of the operation system, outputs the control information to the protection switch 51c to switch the transmission path for the data to the transmission path of the spare system.

The TSI 54 is a processing unit having a cross connect unit 54a to output the data from the communication control units 51 to 53 to each communication control unit set by the TSI control unit. The TSI control unit 55 is a processing unit for setting a communication control unit constituting the destination of the data input to the TSI 54 from the communication control units 51 to 53. When the destination of the data input to the TSI 54 from the communication control unit 51 is set to the communication control unit 52 by the TSI control unit 55, for example, the data input from the communication control unit 51 is output to the communication control unit 52 by the TSI 54.

The conventional transmission apparatus 50 illustrated in FIG. 25 poses the problem that the processing capacity for the line setting to change the transmission path is increased for the protection switches 51c to 53c operated at the transmission rate of the main signal and the SW control units 51d to 53d required to operate at a similar processing rate, resulting in an increased size of the circuit to be included in the communication control units 51 to 53.

Next, an example of the redundant configurations considered in this embodiment is explained. The redundant configurations considered in this embodiment include a 1+1(1:1) redundant configuration, a UPSR (Unidirectional Path Switched Ring) redundant configuration, a BLSR (Bidirectional Line Switched Ring) redundant configuration, a DTW (Dual Transmit on Working) redundant configuration, a DTP (Dual Transmit on Protection) redundant configuration, a DCW (Drop and Continue on Working) redundant configuration and a DCP (Drop and Continue on Protection) redundant configuration.

Figure 26:
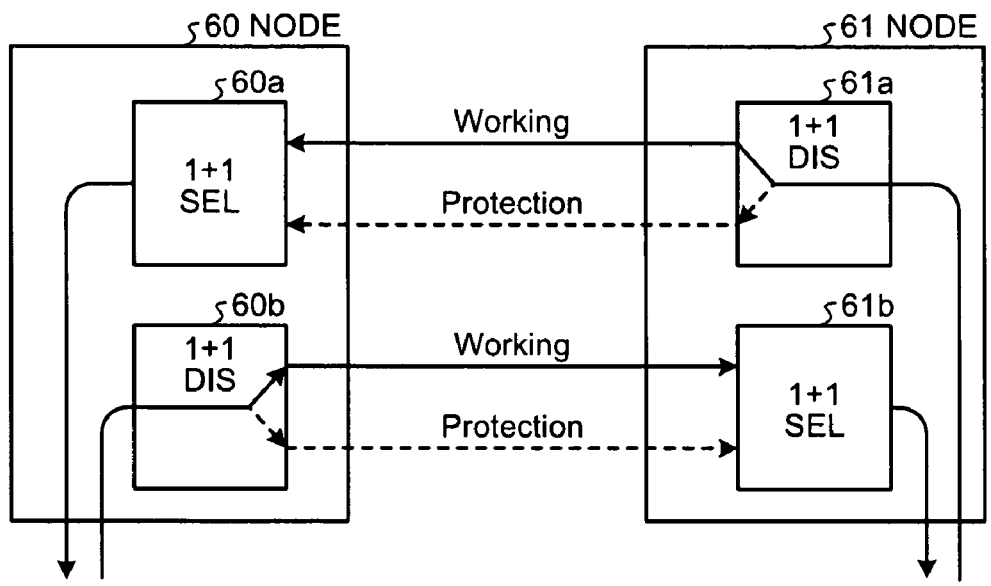
FIG. 26 is a diagram for explaining a 1+1 redundant configuration.

FIG. 26 is a diagram for explaining the 1+1 redundant configuration. As illustrated in this drawing, a node 60 includes a 1+1 SEL 60a and a 1+1 DIS 60b, and a node 61 includes a 1+1 DIS 61a and a 1+1 SEL 61b. The nodes 60 and 61 realize the redundancy by controlling the 1+1 SELs 60a, 61b and the 1+1 DISs 60b, 61a.

In FIG. 26, assuming that a fault occurs in the transmission path of the operation (working) system connecting the 1+1 SEL 60a and the 1+1 DIS 61a, for example, the data is transmitted and received using the transmission path of the spare (protection) system in place of the transmission path in which the fault has occurred.

Figure 27:
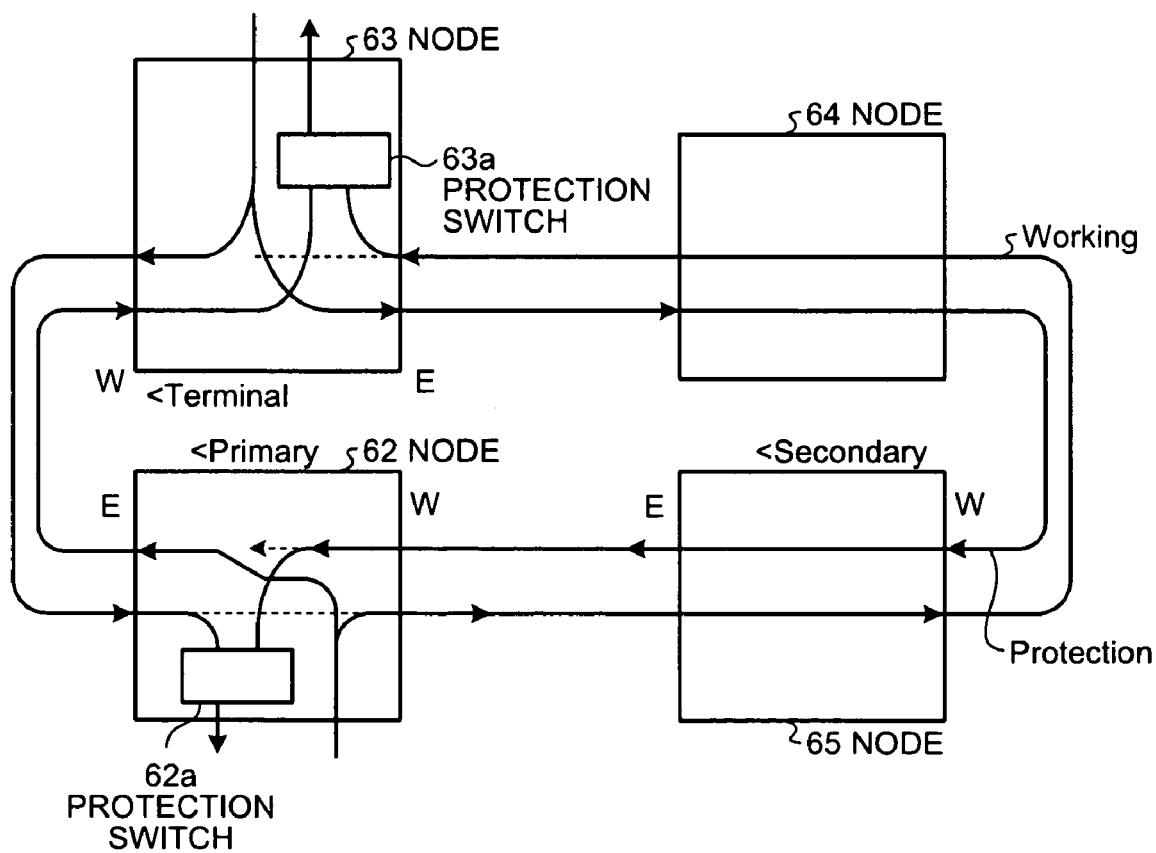
FIG. 27 is a diagram for explaining a UPSR redundant configuration.

FIG. 27 is a diagram for explaining the UPSR redundant configuration. As illustrated in this drawing, the UPSR redundant configuration connects nodes 62 to 65 in a ring with a two-fiber configuration. During the normal time, the data is transmitted in both directions along the ring, while upon occurrence of a fault, protection switch 62a or 63a on the receiving side is controlled to switch to the transmission path of the spare (protection) system, thereby realizing the redundancy. E (east) and W (west) in FIG. 27 are for identifying the direction in which the data is input and output (this is also the case with the other drawings described below).

FIG. 28 is a diagram for explaining the BLSR redundant configuration. As illustrated in this drawing, the BLSR information configuration is such that nodes 66 to 69 are connected in a ring, and the fiber is divided into the time slots of the operation system and the spare system in the same direction. In the BLSR redundant configuration, the data is transferred using the transmission path of the operation (working) system during the normal time, while upon occurrence of a fault, the data is transferred using the transmission path of the spare (protection) system secured in the opposite direction.

The BLSR is limited to 16 stations for each network, and therefore, the extension of each network is limited. For this reason, SSs (Service Selectors) 66a, 67a are used to construct a network of at least 16 stations. Also, in the BLSR redundant configuration, the transmission path is changed by turning ring switches 66b, 66c, 67b, 67c.

Figure 29:
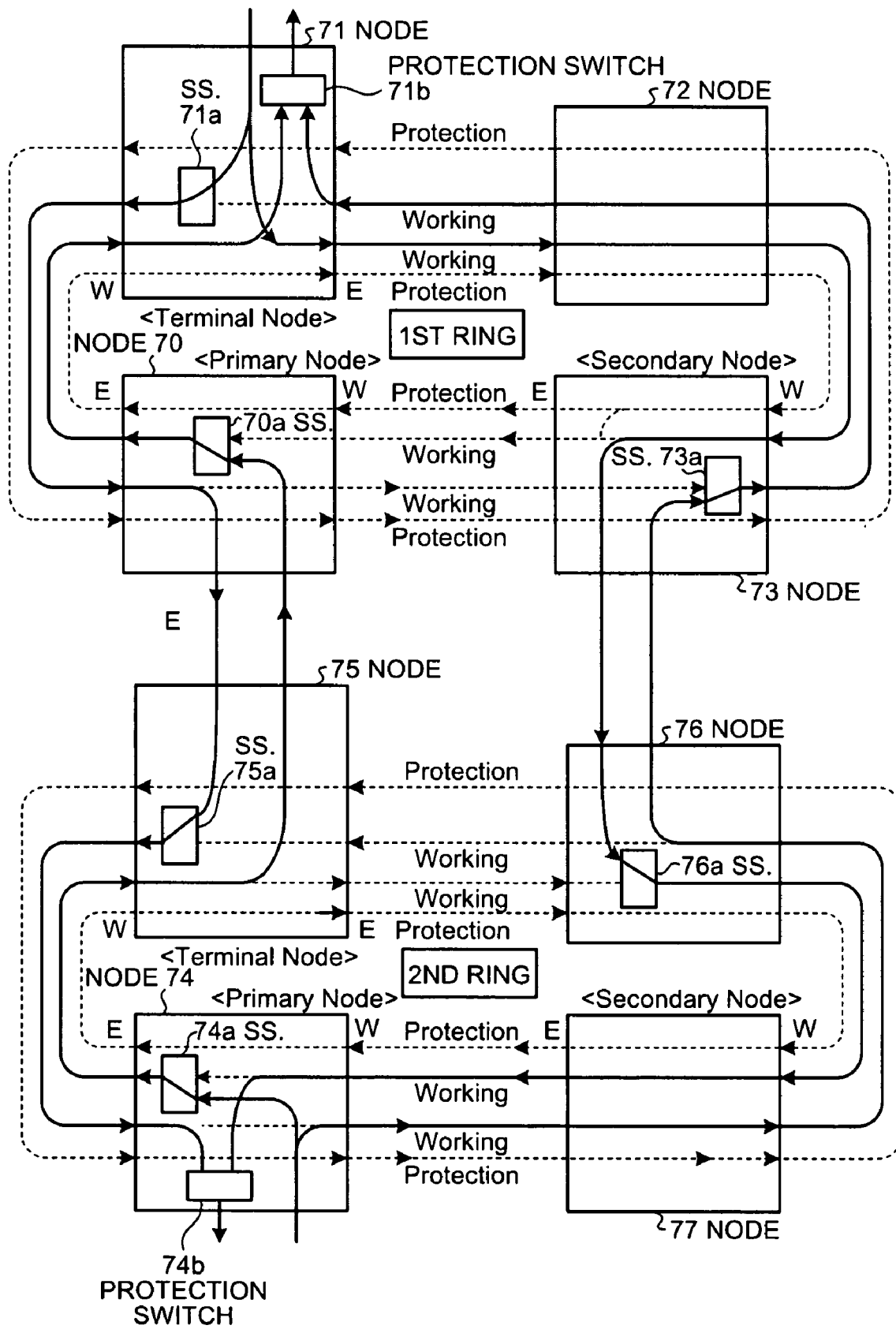
FIG. 29 is a diagram for explaining a DTW redundant configuration (Ring Inter Connection)

FIG. 29 is a diagram for explaining the DTW redundant configuration (Ring Inter Connection). As illustrated in this drawing, the DTW redundant configuration is such that nodes 70 to 73 are connected ringwise to form a first ring, and nodes 74 to 77 are connected ringwise to form a second ring. The nodes 70 and 75 are connected to each other, and so are the nodes 73 and 76.

In the DTW redundant configuration, the redundancy is realized by turning SSs 70a to 76a and protection switches 71b, 74b when a fault occurs in the transmission path or the connection of the first and second rings is switched. The DCP redundant configuration described later uses the transmission path (band) of the spare system in one direction, whereas the DTW redundant configuration uses the transmission path of the operation system in both directions.

Figure 30:
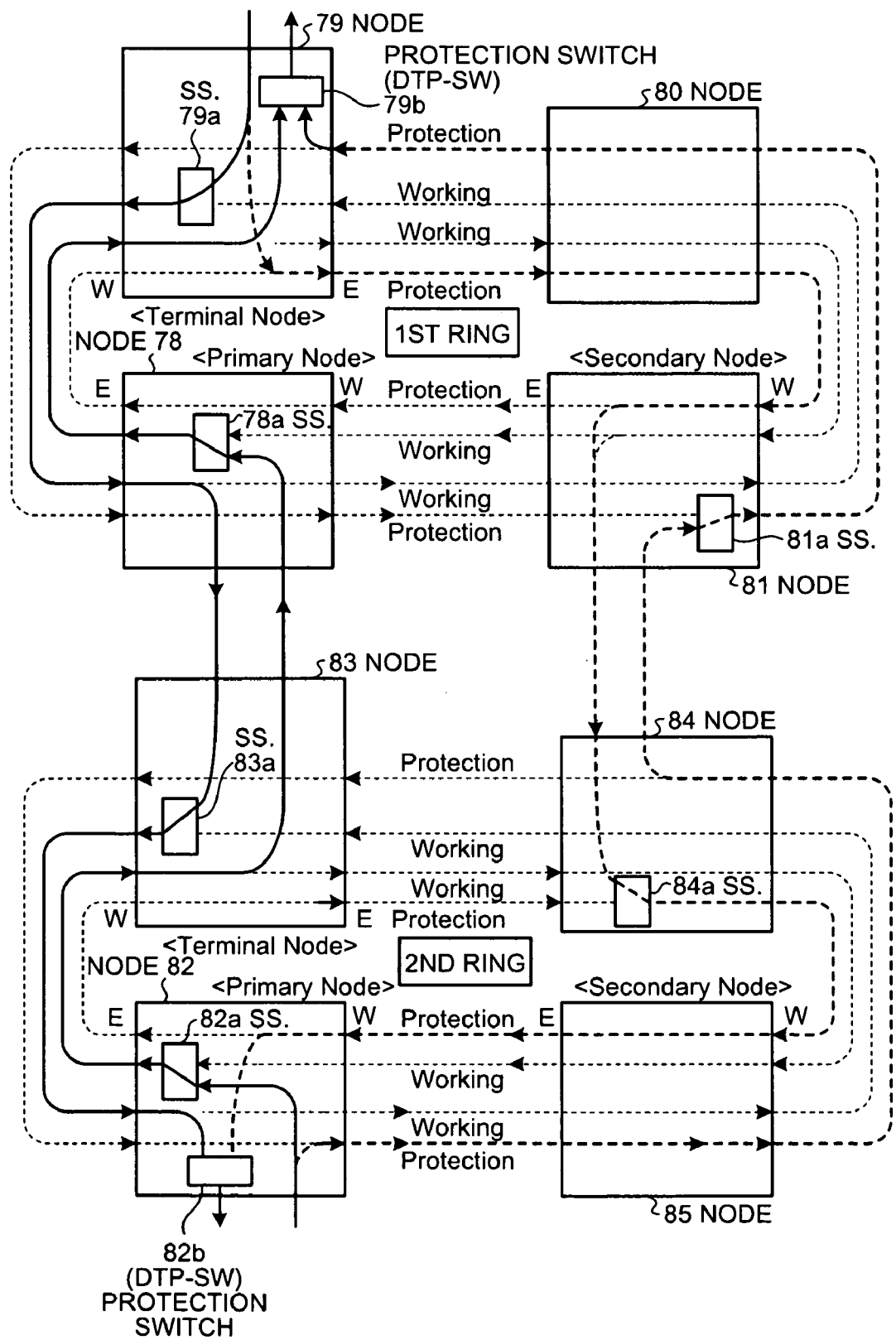
FIG. 30 is a diagram for explaining a DTP redundant configuration (Ring Inter Connection)

FIG. 30 is a diagram for explaining the DTP redundant configuration (Ring Inter Connection). As illustrated in this drawing, the DTP redundant configuration is such that nodes 78 to 81 are connected ringwise to form a first ring, and nodes 82 to 85 ringwise to form a second ring. The nodes 78 and 83 are connected to each other, and so are the nodes 81 and 84.

In the DTP redundant configuration, the redundancy is realized by turning the SSs 78a to 84a and the protection switch (DTP-SW) when a fault occurs in the transmission path or the connection of the first and second rings is switched.

Figure 31:
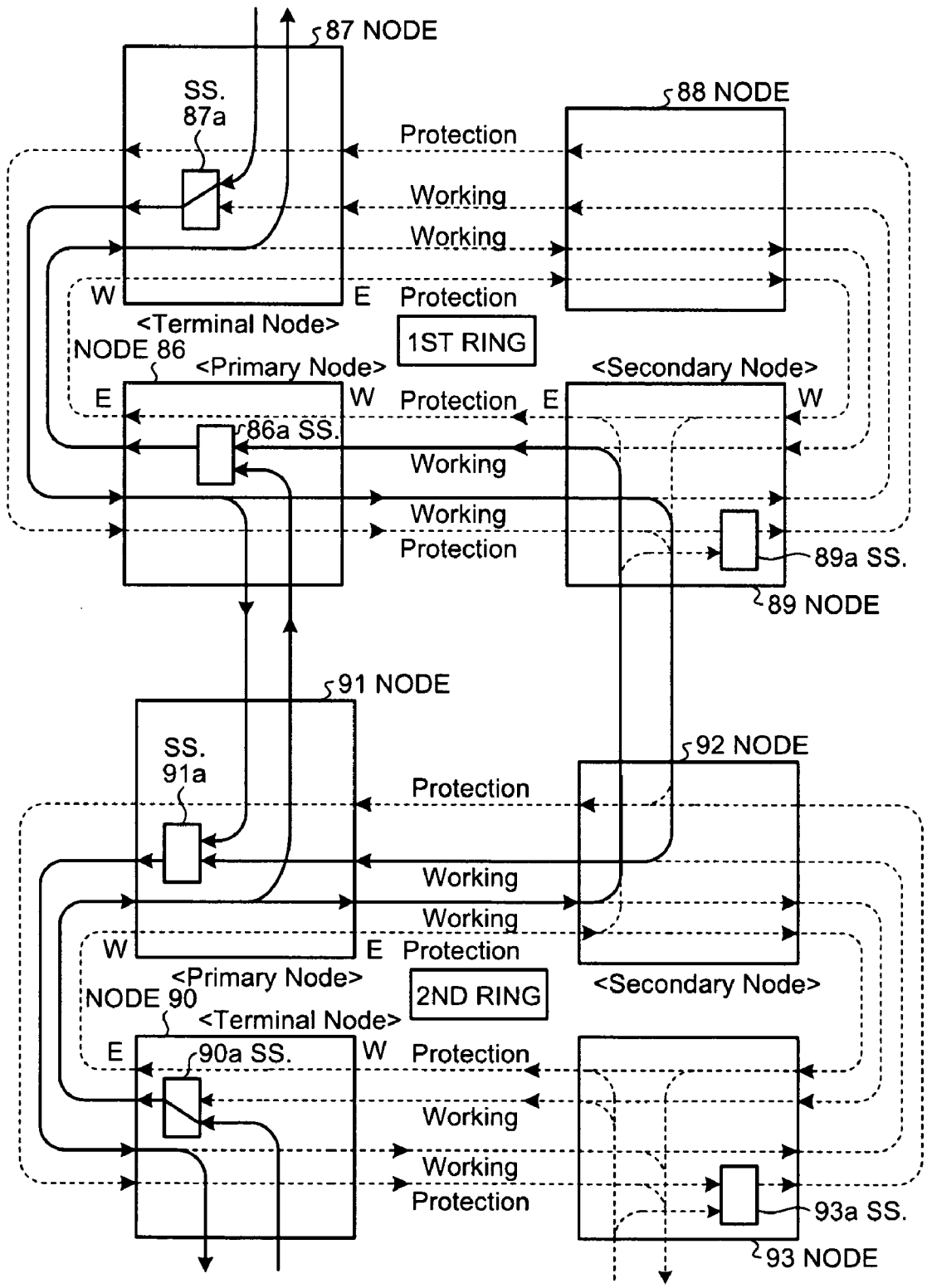
FIG. 31 is a diagram for explaining a DCW redundant configuration (Ring Inter Connection)

FIG. 31 is a diagram for explaining the DCW redundant configuration (Ring Inter Connection). As illustrated in this drawing, the DCW redundant configuration is such that nodes 86 to 89 are connected in ringwise to form a first ring, and nodes 90 to 93 ringwise to form a second ring. The nodes 86 and 91 are connected to each other, and so are the nodes 89 and 94.

In the DCW redundant configuration, the redundancy is realized by switching the SSs 86a to 93a when a fault occurs in the transmission path or the connection of the first and second rings is switched. Also, in the DCW redundant configuration, taking the primary and secondary nodes making up the Ring Inter Connection into consideration, the data dropped in the secondary node uses the transmission path of the operation system.

Figure 32:
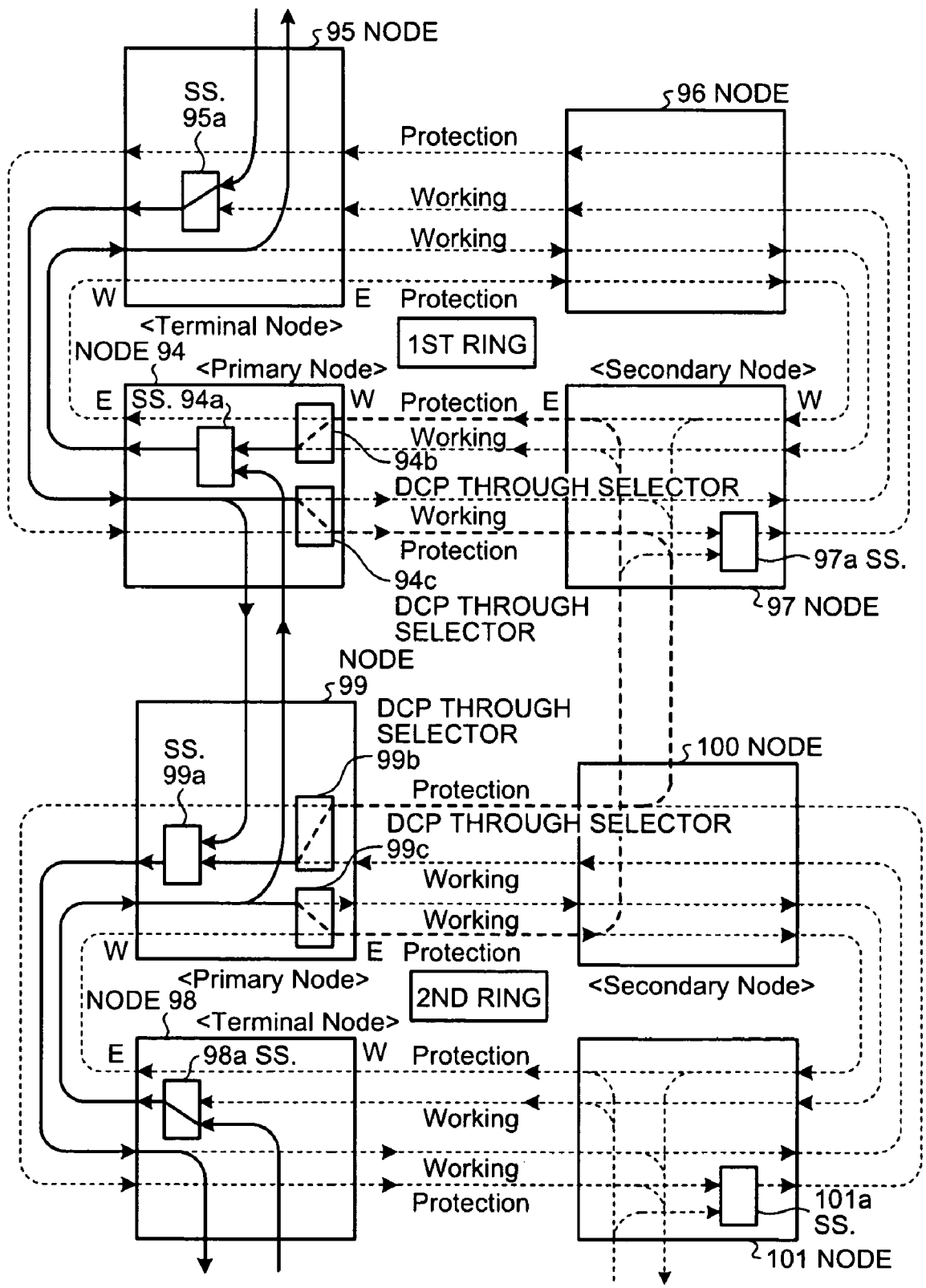
FIG. 32 is a diagram for explaining a DCP redundant configuration (Ring Inter Connection).

FIG. 32 is a diagram for explaining the DCP redundant configuration (Ring Inter Connection). As illustrated in this drawing, the DCP redundant configuration is such that nodes 94 to 97 are connected ringwise to form a first ring, and nodes 98 to 101 ringwise to form a second ring. The nodes 94 and 99 are connected to each other, and so are the nodes 97 and 100.

In the DCP redundant configuration, the redundancy is realized by switching SSs 94a to 101a or DCP through selectors 94b, 94c, 99b and 99c when a fault occurs in the transmission path or the connection of the first and second rings is switched. The DCP through selectors 94b, 94c, 99b and 99c select an input channel, and output the data of the selected input channel as it is to the channel of the output destination.

Also, in the DCP redundant configuration, taking the primary and secondary nodes making up the Ring Inter Connection into consideration, the data dropped in the secondary node is output to the transmission path of the spare system.

Next, an outline and features of the transmission apparatus according to this embodiment are explained. In the transmission apparatus according to this embodiment, unlike in the conventional transmission apparatus 50 illustrated in FIG. 25, the protection is not secured by the signal path (communication control units 51 to 53), but by causing the TSI 54 having only the basic functions to take charge of the functions of the protection switches 51c to 53c, so that a pseudo processing unit having a low-speed switching function is constructed in the TSI 54.

In the transmission apparatus according to this embodiment, the switching process of SONET protection type (the switching process explained with reference to FIGS. 26 to 32, for example) is executed virtually by the TSI, and by further controlling the signal for controlling the TSI function, the protection switch function is realized. Thus, the logic of the switching operation at the main signal rate in addition to the TSI function in the prior art is deleted, with the result that the circuits operating at high speed are reduced and the problem of power consumption is obviated.

Also, in the conventional transmission apparatus 50 illustrated in FIG. 25, the protection switches 51c to 53c operating at the transmission rate of the main signal and the SW control units 51d to 53d required to operate at a similar processing rate are required to execute the process each slot in the SONET time slot process. Especially, when the time slots are processed serially, the switching operation is repeated at the same processing rate with the same number of time slots.

In the transmission apparatus according to this embodiment, in contrast, the signal for controlling the TSI can be set, as the lowest rage, at time intervals hit by turning the protection switch, and in the worst case, the control operation can be performed at time intervals one half of 50 ms constituting the standard value. By operating the protection switch virtually at this rate (one half of 50 ms), the power consumption can be reduced as compared with the prior art. Also, in terms of line size, the processing capacity can be increased by the serial process, thereby making it possible to realize the functions with a smaller chip.

Figure 1:
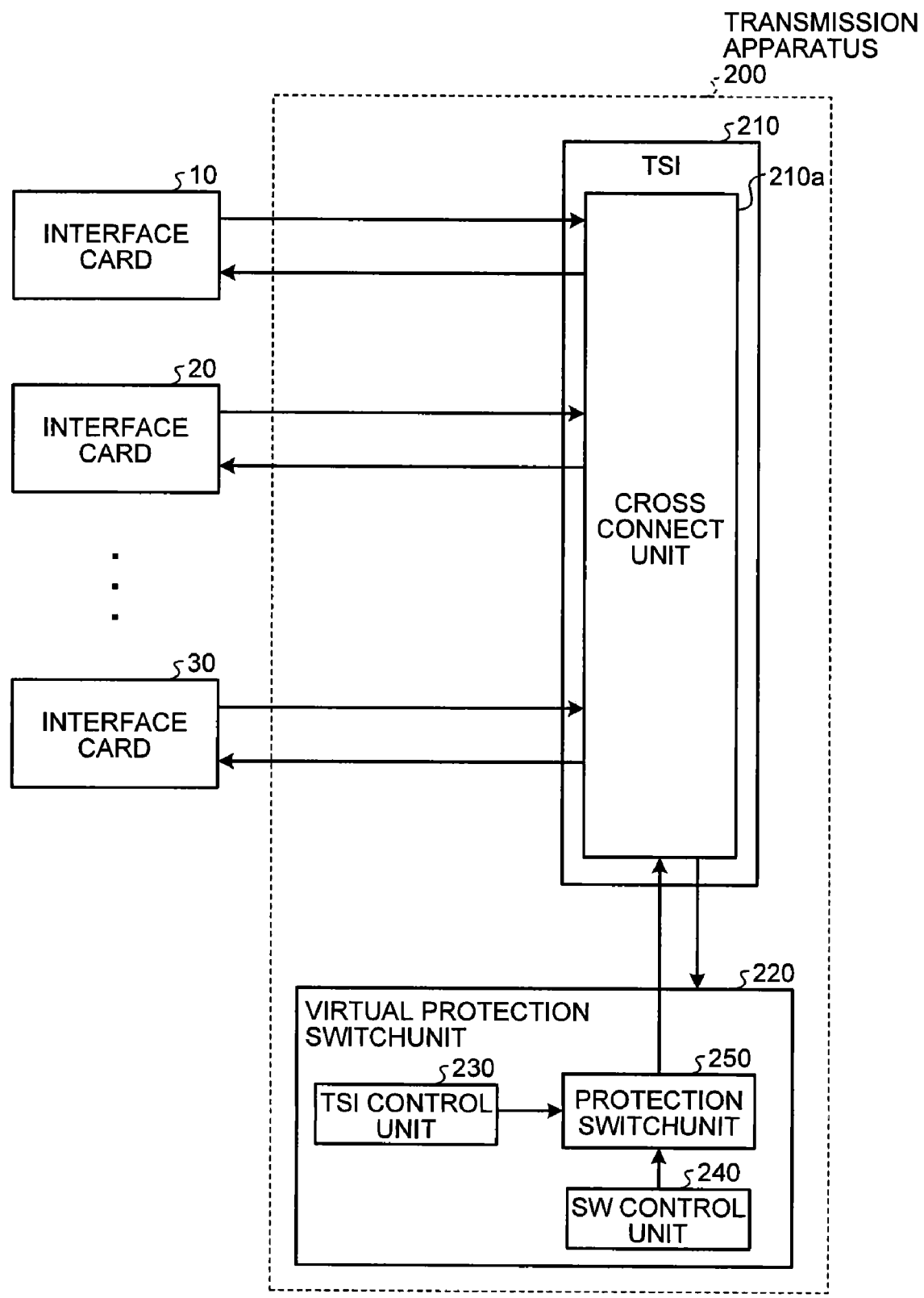
FIG. 1 is a function block diagram illustrating the configuration of a transmission apparatus according to an embodiment.

Now, the configuration of the transmission apparatus according to this embodiment is explained. FIG. 1 is a function block diagram illustrating the configuration of the transmission apparatus according to this embodiment. As illustrated in this drawing, a transmission apparatus 200 is configured of a TSI 210 and a virtual protection switch unit 220. Also, the slots (not depicted) of the transmission apparatus 200 are connected to the interface cards 10 to 30.

In the transmission apparatus 200, the provision of a slot identifier makes it possible to identify any one of the plural interface cards. Also, the interface cards each have one or plural ports, each making up an interface unit connected with, for example, an optical fiber. By providing a port identifier, therefore, any one of the plural interface units of a corresponding interface card can be identified. As a result, the interface of the transmission path with other transmission apparatuses for input/output of the transmission apparatus 200 can be specified by the slot identifier and the port identifier as a combination. This combination is referred to as a transmission path interface identifier. Each channel is that of SONET/SDH, etc., and the STM (Synchronous Transport Module) of the data signal.

The transmission apparatus according to this embodiment assumes that, for example, 16 ports exist in one slot and 48 channels (ch) in one port.

The TSI 210 is a processing unit which has a cross connect unit 210a, sets the input/output channels in correspondence (or switches the transmission path) with each other based on the control signal from the virtual protection switch unit 220, and outputs the input data (optical signal) from the interface cards 10 to 30 to the set interface card. The TSI 210 switches the transmission path for the data from the interface cards 10 to 30 in response to the control signal from the virtual protection switch unit 220, thereby making it possible to collectively replace the protection switch function thus far executed by each of the communication control units 51 to 53 illustrated in FIG. 25.

The virtual protection switch unit 220 is a processing unit which sets the input channel and the output channel of the cross connect unit 210a in correspondence with each other to realize the redundant configuration illustrated in FIGS. 26 to 32, and configured of a TSI control unit 230, a SW control unit 240 and a protection switch unit 250. The virtual protection switch unit 220, for example, holds the information on the correspondence between the input and output channels in accordance with the redundant configuration illustrated in FIGS. 26 to 32, and based on this information, sets the input and output channels of the cross connect unit 210a thereby to switch the transmission path for the optical signal.

Now, the TSI control unit 230 is a processing unit which controls the correspondence between the input and output channels of the cross connect unit 210a, and the SW control unit 240 is a processing unit which switches the transmission path for the data input to the cross connect unit 210a (changes the correspondence between the input and output channels) when a fault occurs on the network. The TSI control unit 230 and the SW control unit 240 switch the transmission path of the cross connect unit 210a through the protection switch unit 250. The protection switch unit 250 is a processing unit which switches the transmission path of the cross connect unit 210a based on the data input from the TSI control unit 230 and the SW control unit 240.

Figure 2:
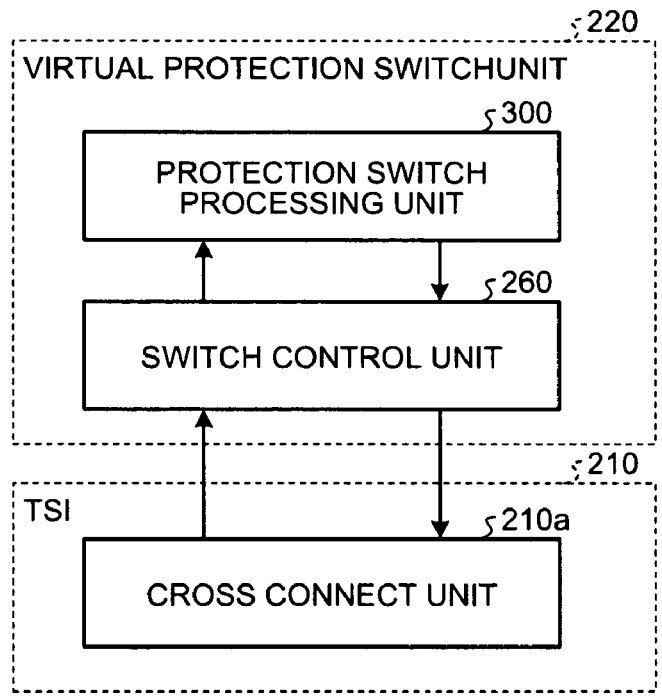
FIG. 2 is a diagram illustrating the configuration of a virtual protection switch unit.

Next, a specific configuration of the virtual protection switch unit 220 illustrated in FIG. 1 is explained. FIG. 2 is a diagram illustrating the configuration of the virtual protection switch unit 220. In this drawing, the explanation of the TSI 210 is similar to that of the TSI 210 in FIG. 1 and therefore omitted.

A protection switch processing unit 300 is for executing the switch control operation of each application to realize the redundant configuration illustrated in FIGS. 26 to 32. A switch control unit 260 has the function as an interface with the CPU (not depicted) of the transmission apparatus 200 on the one hand, and outputs, to the protection switch processing unit 300 in response to the control signal from the CPU, the various setting information (the data on the transmission path in which a fault has occurred, the data indicating the relation between the transmission path of the operation system and the transmission path of the spare system, etc.) used by the protection switch processing unit 300 on the other hand. The functions of the TSI control unit 230, the SW control unit 240 and the protection switch unit 250 illustrated in FIG. 1 are included in the functions of the switch control unit 260 and the protection switch processing unit 300.

Figure 3:
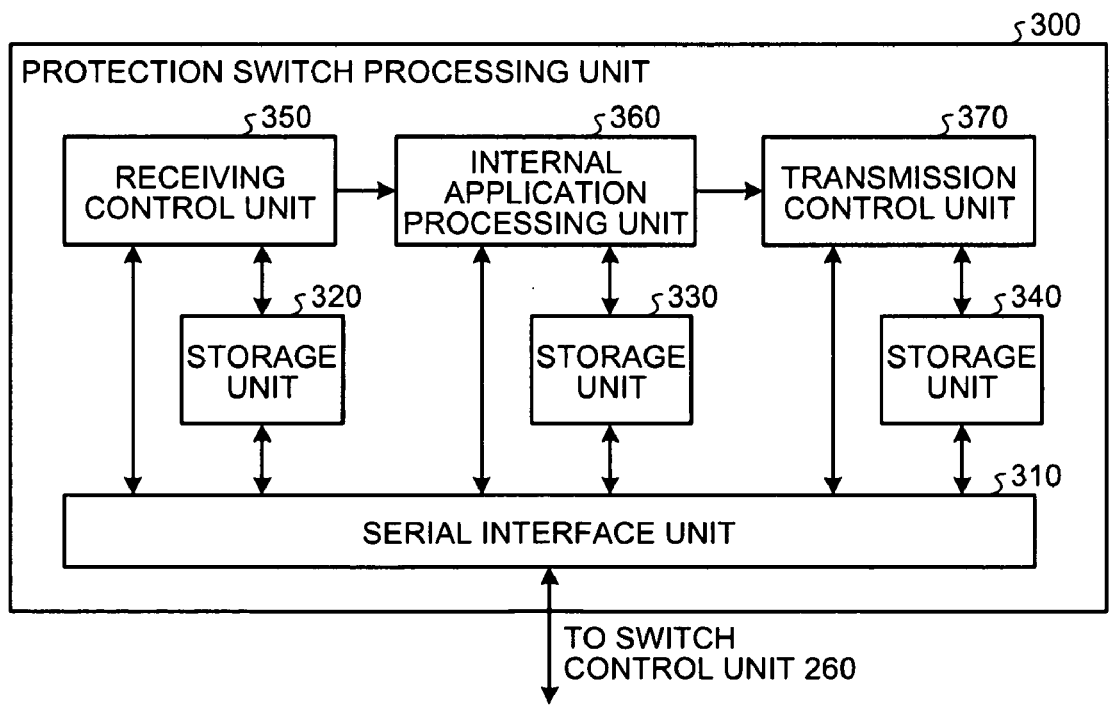
FIG. 3 is a function block diagram illustrating the configuration of a protection switch processing unit.

Next, a specific configuration of the protection switch processing unit 300 illustrated in FIG. 2 is explained. FIG. 3 is a function block diagram illustrating the configuration of the protection switch processing unit 300. As illustrated in this drawing, the protection switch processing unit 300 includes a serial interface unit 310, storage units 320 to 340, a receiving control unit 350, an internal application processing unit 360 and a transmission control unit 370.

Among these units, the serial interface unit 310 is a processing unit for controlling the data input and output to and from the switch control unit 260, and causes the various setting data input from the switch control unit 260 to be stored in the storage units 320 to 340.

Also, the switch control unit 260, upon acquisition of the input/output channel data indicating the correspondence between the input channel (group) and the output channel (group) from the transmission control unit 370, switches the cross connect unit 210a based on the particular input/output channel data.

When an input channel 1 and an output channel 2 are set in correspondence with each other in the input/output channel data, for example, the switch control unit 260 switches the cross connect unit 210a in such a manner that the optical signal input to the input channel 1 may be output to the output channel 2.

The storage units 320 to 340 are for storing the various setting information, etc. input from the switch control unit 260, and the various setting information in the storage units 320 to 340 are updated by the switch control unit 260 at predetermined time intervals or upon occurrence of a fault, etc. in the transmission path. The storage unit 320 mainly stores the ACM code group data, the Slot Chg Rx setting data, the receiving-side fault management data and the receiving-side operation system/spare system slot correspondence data.

Each slot connected to the interface cards 10 to 30 has 16 ports, and 48 ch (channels) are allotted to each port. The receiving control unit 350 described later generates an ACM code to identify each channel uniquely, and a mass of the ACM codes thus generated is stored as an ACM code group data in the storage unit 320. The ACM codes included in the ACM code group data are stored in correspondence with the corresponding slots and the ports, respectively. FIG. 4 is a diagram illustrating an example of the data structure of the ACM code group data.

The Slot Chg Rx setting data is the information for setting the place (address) of the ACM code read by the receiving control unit 350 on the ACM code group data described above. FIG. 5A is a diagram illustrating an example of the Slot Chg Rx setting data. As illustrated in this drawing, the Slot Chg Rx setting data has an AIS (Alarm Indication Signal), a RES (Reserve) and D7 to D0.

Among them, the AIS stores the information indicating whether a fault, etc. has occurred or not in the slot or port involved. Also, D0 to D3 store the information for identifying the ports, and D4 to D7 the information for identifying the slots. By referring to D0 to D7, the ACM code to be read by the receiving control unit 350 is uniquely determined.

FIG. 5B is a diagram illustrating the correspondence between the numerical values input to D0 to D7 and the slots and ports corresponding to the numerical values, respectively (the information illustrated in FIG. 5B is stored in, for example, the storage unit 320). When "xxx000000" is set in Res and D0 to D7, for example, the ACM code corresponding to "Port0" of the slot identified by "SLOTa*4" is extracted from the ACM code group. The Slot Chg Rx setting data is sequentially updated by the switch control unit 260.

Also, in order to identify each of the ACM code masses extracted sequentially by the receiving control unit 350 based on the Slot Chg Rx setting data illustrated in FIG. 5A, the ACM code group that has been read is set in correspondence with the identification information (Sys(80G#m)-Sys(#m)-side1(Side2).

The receiving-side fault management data is the information indicating whether a fault has occurred or not in the transmission path of the operation system and the transmission path of the spare system, in correspondence with each transmission path (or slot). This receiving-side fault management data is updated at predetermined time intervals (or upon occurrence of a fault in the transmission path) by the switch control unit 260.

The receiving-side operation system/spare system slot correspondence data is the data including the slots of the operation system set in correspondence with the slots of the spare system. FIG. 6 is a diagram illustrating an example of the data structure of the receiving-side operation system/spare system slot correspondence data. As illustrated in this drawing, the slots of the operation system are set in correspondence with the slots of the spare system, the slot of the operation system and the slot of the spare system are varied for each case (Case1, Case2). Which of the cases is to be followed is assumed to be predetermined.

When the setting is "Case1" in FIG. 6, for example, the slots 2 to 6 of the operation system are set in correspondence with the slot 1 of the spare system. When the setting is "Case2", on the other hand, the slots 1 to 5 of the operation system are set in correspondence with the slot 6 of the spare system.

A storage unit 330 stores the BLSR change code and other setting data. The BLSR change code and other setting data stored in the storage unit 330 are explained later.

The storage unit 340 mainly stores the slot change data, the Slot Chg Tx setting data, the transmission-side fault management data and the transmission-side operation system/spare system slot correspondence data. Among these data, the slot change data and the Slot Chg Tx setting data are explained later.

The transmission-side fault management data is the information indicating whether a fault has occurred in the transmission path of the operation system, set in correspondence with each transmission path (or each slot). This transmission-side fault management data is updated by the switch control unit 260 at predetermined time intervals (or upon occurrence of a fault on the transmission path anew).

The transmission-side operation system/spare system slot correspondence data is the data with the slots of the operation system set in correspondence with the slots of the spare system. The transmission-side operation system/spare system slot correspondence data has a similar data structure to the receiving-side operation system/spare system slot correspondence data illustrated in FIG. 6, and therefore, not explained.

Returning to FIG. 3, the receiving control unit 350 is a processing unit for executing the ACM code generation process, the receiving-side slot change process (Slot Chg Rx) and the receiving-side line select process (LINE SEL). First, the generation of the ACM code by the receiving control unit 350 is explained. The receiving control unit 350 detects the slots and ports connected to the interface cards 10 to 30 and the channels allotted to the ports, allots the ACM code to each detected channel, and stores the data of the allotted ACM codes as an ACM code group data in the storage unit 320.

Now, the slot change process executed by the receiving control unit 350 is explained. In the slot change process, the time slots of the operation system/spare system are allotted (or separated) for the application to realize the redundant configuration as illustrated in FIGS. 26 to 32. The time slot allotment (or separation) is carried out based on the Slot Chg Rx setting data stored in the storage unit 320.

Figure 7:
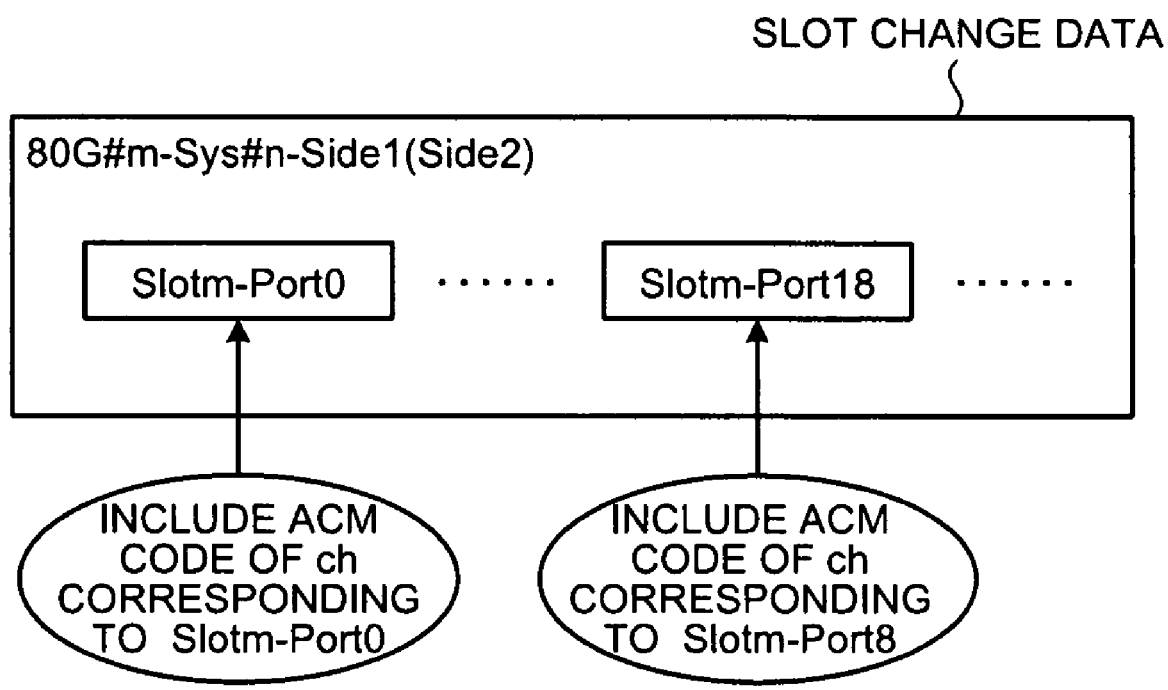
FIG. 7 is a diagram illustrating an example of the data structure of a slot change data.

The receiving control unit 350, by referring to the Slot Chg Rx setting data stored in the storage unit 320, extracts each ACM code from the place of the ACM group data designated by the Slot Chg Rx setting data. Then, the receiving control unit 350 generates the slot change data in which each extracted ACM code is set in correspondence with the ports and slots having the particular ACM code. FIG. 7 is a diagram illustrating an example of the data structure of the slot change data.

Also, as illustrated in FIG. 7, the slot change data is set in correspondence with the identification information "Sys (80G#m)-Sys(#m)-Side1(Side2)" for identifying the particular slot change data. Each time the Slot Chg Rx setting data stored in the storage unit 320 is updated by the switch control unit 260, the receiving control unit 350 generates the slot change data based on the Slot Chg Rx setting data thus updated.

Now, the line select process executed by the receiving control unit 350 is explained. The line select process is executed to switch the transmission path (the slot corresponding to the transmission path) of the operation system/spare system in accordance with the fault occurrence situation. The receiving control unit 350 compares the slot contained in the slot change data with the receiving-side fault management data stored in the storage unit 320, and judges whether a fault has occurred in the slot of the slot change data or not.

The receiving control unit 350, upon judgment that a fault has occurred, executes the process of replacing the slot of the slot change data with the slot of the spare system free of a fault. The slot of the operation system is replaced by the slot of the spare system based on the receiving-side operation system/spare system slot correspondence data (FIG. 6) stored in the storage unit 320. When a fault has occurred in the slot 2, for example, it is replaced by the slot 1 (Case1).

Figure 8:
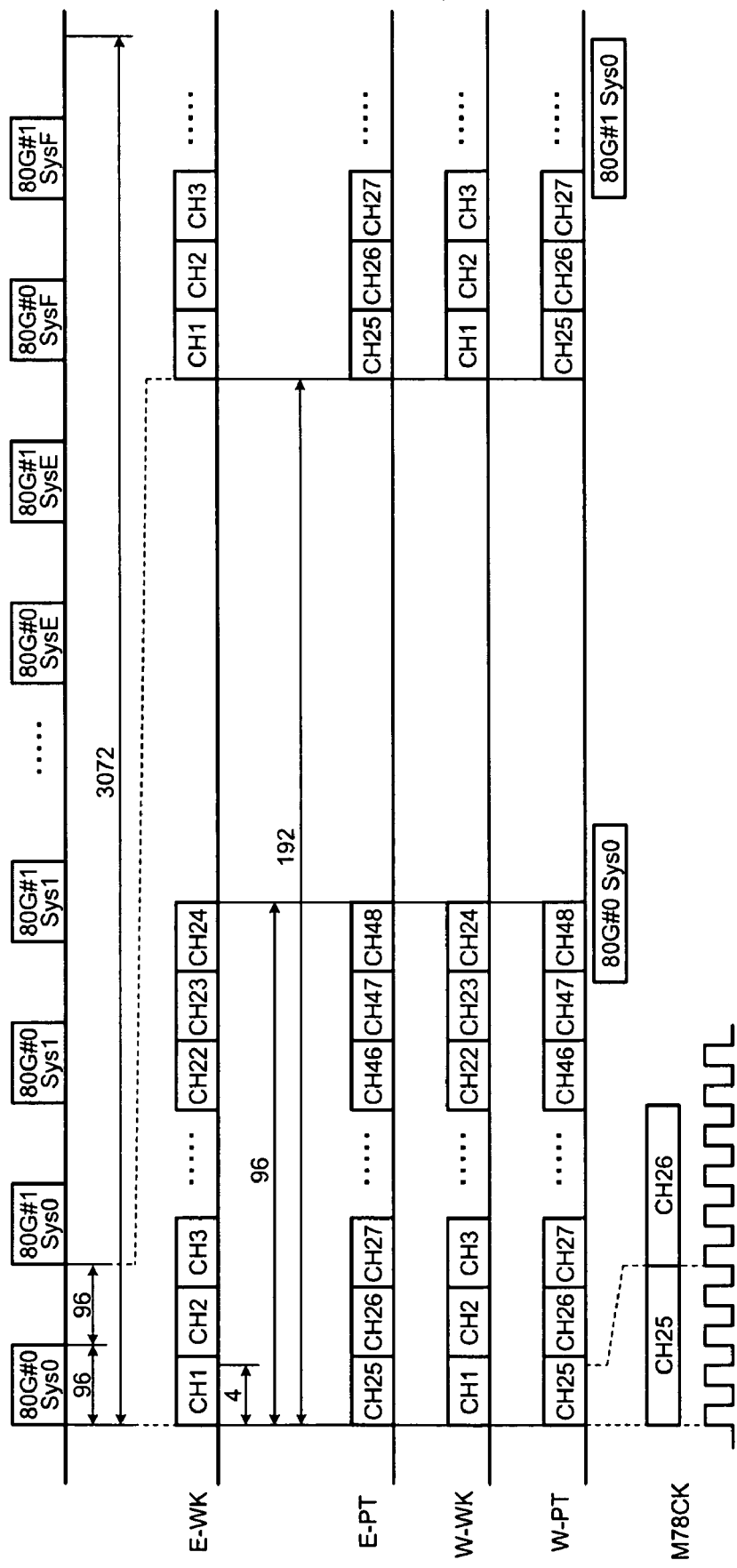
FIG. 8 is a diagram illustrating an example of the internal timing.

An internal timing chart between the receiving control unit 350 and the internal application processing unit 360 is illustrated. FIG. 8 is a diagram illustrating an example of the internal timing. As illustrated in this drawing, the slot change data are sequentially output from the receiving control unit 350 to the internal application processing unit 360. The ACM code is allotted to each channel illustrated in FIG. 8.

Figure 9:
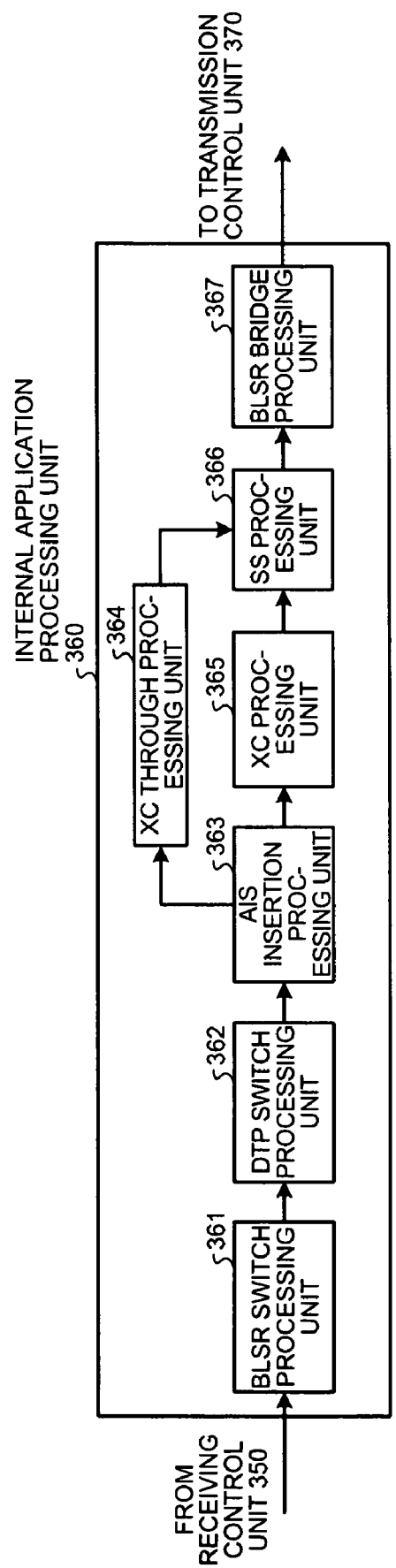
FIG. 9 is a diagram illustrating the configuration of an internal application processing unit.

Next, an explanation is given about the internal application processing unit 360. FIG. 9 is a diagram illustrating a configuration of the internal application processing unit 360. As illustrated in this drawing, the internal application processing unit 360 includes a BLSR switch processing unit 361, a DTP switch processing unit 362, an AIS insertion processing unit 363, a XC (cross connect) through processing unit 364, a XC processing unit 365, a SS (Service Selector) processing unit 366 and a BLSR bridge processing unit 367.

The BLSR switch processing unit 361 is for relieving the BLSR. When a fault occurs in the transmission path of the operation system in the configuration illustrated in FIG. 28, for example, the slot included in the particular transmission of the operation system is switched to the slot included in the transmission path of the spare system.

Specifically, the BLSR switch processing unit 361, based on the BLSR change code stored in the storage unit 330, rearranges the channels in the slot change data sequentially input to the internal application processing unit 360. FIG. 10 is a diagram for explaining the outline of the BLSR switch processing unit (the data corresponding to FIG. 10 are assumed to be stored in the storage unit 330).

As illustrated in FIG. 10, in the BLSR switch process executed by the BLSR switch processing unit 361, the control operation is executed to rearrange the channels in the slot change data according to a preset mode "OC768 2F BLSR/OC192 4F BLSR, OC768 4F BLSR". The BLSR switch process includes an Rx-side process and a Tx-side process.

In the Rx-side process, in order to meet the requirement of the interface according to the BLSR processing standard, an arbitrary one of the slots 1 to 4 is selected based on a preset data, and STS (Synchronous Transport Signal)-24 units (STS-1 corresponds to one channel) are replaced for all the Sys (Sys is a division of the slot change data for each predetermined channel).

In the control operation by SYS#(m)/#(m+4)-Side1 (m=0, 1, 2, 3, 8, 9, A, C) with the BLSR change code "10" stored in the storage unit 330 (first stage from top, left side in FIG. 10), for example, the ACM code stored in "Sys#(m)-Side1-CH25 to 48" is replaced by "Sys#(m+4)-Side1-CH01 to 24". Also, the ACM code stored in "Sys#(m+4)-Side1-CH01 to 24" is replaced by "Sys#(m)-Side1-CH25 to 48".

In the control operation by SYS#(m)/#(m+4)-Side1 (m=0, 1, 2, 3, 8, 9, A, C) with the BLSR change code "11" stored in the storage unit 330 (second stage from top, left side in FIG. 10), on the other hand, the ACM code stored in "Sys#(m)-Side1-CH25 to 48" is replaced by "Sys#(m+4)-Side1-CH01 to 24". Also, the ACM code stored in "Sys#(m)-Side2-CH01 to 24" is replaced by "Sys#(m)-Side1-CH25 to 48". Further, the ACM code stored in "Sys#(m)-Side2-CH25 to 48" is replaced by "Sys#(m+4)-Side1-CH25 to 48".

Also, in the control operation by SYS#(m)/#(m+4)-Side2 (m=0, 1, 2, 3, 8, 9, A, C) with the BLSR change code "10" stored in the storage unit 330 (third stage from top, left side in FIG. 10), the ACM code stored in "Sys#(m)-Side2-CH25 to 48" is replaced by "Sys#(m+4)-Side2-CH01 to 24". Also, the ACM code stored in "Sys#(m+4)-Side2-CH01 to 24" is replaced by "Sys#(m)-Side2-CH25 to 48".

Also, in the control operation by SYS#(m)/#(m+4)-Side2 (m=0, 1, 2, 3, 8, 9, A, C) with the BLSR change code "11" stored in the storage unit 330 (fourth stage from top, left side in FIG. 10), the ACM code stored in "Sys#(m+4)-Side1-CH01 to 24" is replaced by "Sys#(m)-Side2-CH01 to 24". Also, the ACM code stored in "Sys#(m+4)-Side1-CH25 to 48" is replaced by "Sys#(m+4)-Side2-CH01 to 24". Further, the ACM code stored in "Sys#(m+4)-Side2-CH01 to 24" is replaced by "Sys#(m)-Side2-CH25 to 48".

In the Tx-side process, in order to meet the requirement of the interface according to the slot standard in place of the interface of the BLSR processing standard, an arbitrary Sys-Side is selected (STS-192 capacity units) and STS-24 units replaced in Sys(80G#0,1/#0-15) for all the Sys according to preset information. The various setting data used in the Rx- and Tx-side processes described above are assumed to be stored in the storage unit 330 through the switch control unit 260.

In the control operation by SYS#(m)/#(m+4)-Side1 (m=0, 1, 2, 3, 8, 9, A, C) with the BLSR change code "10" stored in the storage unit 330 (first stage from top, right side in FIG. 10), for example, the ACM code stored in "Sys#(m)-Side1-CH25 to 48" is replaced by "Sys#(m+4)-Side1-CH01 to 24". Also, the ACM code stored in "Sys#(m+4)-Side1-CH01 to 24" is replaced by "Sys#(m)-Side1-CH25 to 48".

Also, in the control operation by SYS#(m)/#(m+4)-Side1 (m=0, 1, 2, 3, 8, 9, A, C) with the BLSR change code "11" stored in the storage unit 330 (second stage from top, right side in FIG. 10), on the other hand, the ACM code stored in "Sys#(m)-Side1-CH25 to 48" is replaced by "Sys#(m)-Side2-CH01 to 24". Also, the ACM code stored in "Sys#(m+4)-Side1-CH01 to 24" is replaced by "Sys#(m)-Side1-CH25 to 48". Further, the ACM code stored in "Sys#(m+4)-Side1-CH25 to 48" is replaced by "Sys#(m)-Side2-CH25 to 48".

Also, in the control operation by SYS#(m)/#(m+4)-Side2 (m=0, 1, 2, 3, 8, 9, A, C) with the BLSR change code "10" stored in the storage unit 330 (third stage from top, right side in FIG. 10), the ACM code stored in "Sys#(m)-Side2-CH25 to 48" is replaced by "Sys#(m+4)-Side2-CH01 to 24". Also, the ACM code stored in "Sys#(m+4)-Side2-CH01 to 24" is replaced by "Sys#(m)-Side2-CH25 to 48".

Further, in the control operation by SYS#(m)/#(m+4)-Side2 (m=0, 1, 2, 3, 8, 9, A, C) with the BLSR change code "11" stored in the storage unit 330 (fourth stage from top, right side in FIG. 10), the ACM code stored in "Sys#(m)-Side2-CH01 to 24" is replaced by "Sys#(m+4)-Side1-CH01 to 24". Also, the ACM code stored in "Sys#(m)-Side2-CH25 to 48" is replaced by "Sys#(m+4)-Side2-CH01 to 24". Further, the ACM code stored in "Sys#(m+4)-Side2-CH01 to 24" is replaced by "Sys#(m+4)-Side1-CH25 to 48".

In the BLSR switch process with the BLSR change code "00" or "01" stored in the storage unit 330, the slot change data are not rearranged.

The DTP switch processing unit 362 is a processing unit which realizes the ring interconnection by switching the primary node (the transmission path of the operation system) and the secondary node (the transmission path of the spare system) from another network (network making up a ring) through a terminal node, for example, in the configuration illustrated in FIG. 30.

Assume that a DTP conversion table is stored in the storage unit 330. FIG. 11 is a diagram illustrating an example of the data structure of the DTP conversion table. As illustrated in this drawing, the DTP conversion table stores the slot to be converted and the slot after conversion in correspondence with each other. On the first stage in FIG. 11, for example, the slot to be converted is "slot 1", and the slot after conversion is "slot 3".

In the DTP switch processing unit 362, each slot contained in the slot change data output from the BLSR switch processing unit 361 is compared with the DTP conversion table illustrated in FIG. 11 thereby to convert the slot of the slot change data.

The AIS insertion processing unit 363 is a processing unit for inserting the AIS (the data indicating the fault occurrence) in the slot change data when the information indicating that a fault has occurred in the transmission path is stored in the storage unit 330. In view of the fact that the same channel is used by plural lines, a fault, if developed at plural points, may cause the misconnection of the line, in which case the AIS is inserted in the particular line misconnected (the slot of the slot change data corresponding to the line). The storage unit 330 is assumed to store the identification information of the transmission path (the slot included in the transmission path) in which the fault has occurred.

Now, the XC through processing unit 364 is explained. The XC through process is executed by this XC through processing unit 364 when a line fault occurs with the redundant configuration set in such a mode as to implement the BLSR redundant configuration as illustrated in FIG. 28.

In all the ring-shaped XC through processes, the XC through processing unit 364 stops the insertion (addition) of various information in the channels contained in the slots of the spare system and outputs the channels of the spare system as they are to the SS processing unit 366. The XC through process is executed by reason of the fact that when a fault occurs in a mode to implement the BLSR redundant configuration, the channels of the operation system are relieved using the ring-shaped channels of the spare system.

When the data indicating the line fault occurrence is stored in the storage unit 330 in a mode to implement the BLSR redundant configuration as illustrated in FIG. 28, for example, the slot change data is input to the XC through processing unit 364. Otherwise, the slot change data is input to the XC processing unit 365.

The XC processing unit 365 is a processing unit for setting the cross connect line (replacing the slots contained in the slot change data). When a fault occurs with the DCP redundant configuration as illustrated in FIG. 32, for example, the XC processing unit 365 switches the slots contained in the slot change data from the slots of the operation system to the slots of the spare system. The data as a reference for switching the slots of the slot change data is stored in the storage unit 330.

Now, the SS processing unit 366 is explained. As long the BLSR redundant configuration as illustrated in FIG. 28 prevails, each network is limited to 16 stations, so that the extendibility of each network is limited. For this reason, the SS processing unit 366 realizes a ring connection required to construct a network of at least 16 stations.

The SS processing unit 366 has the function of selecting either the signal received by the primary node or the signal received by the secondary node. Specifically, the slot corresponding to the signal received by the primary node or the slot corresponding to the signal received by the secondary node is selected. The information on the slot to be selected by the SS processing unit 366 is stored in the storage unit 330.

A BLSR processing unit 36 is a processing unit which, upon occurrence of a line fault, converts the slots contained in the transmission path of the operation system to the slots contained in the transmission path of the spare system. The BLSR bridge processing unit 367 converts the slots contained in the transmission path of the operation system to the slots contained in the transmission path of the spare system in the same direction in span switch mode, and to the slots contained in the transmission path of the spare system in the opposite direction in ring switch mode.

Returning to FIG. 3, the transmission control unit 370 is a processing unit which executes the line select process on transmission side (LINE DIS) and the slot change process (Slot Chg Tx) on transmission side. First, the line select process executed by the transmission control unit 370 is explained. In accordance with the fault occurrence situation, the transmission control unit 370 switches the line (slot) of the operation system to the line (slot) of the spare system. In the transmission control unit 370, the slots contained in the slot change data are compared with the transmission-side fault management data stored in the storage unit 340 thereby to judge whether a fault has occurred in any slot of the slot change data.

The transmission control unit 370, upon judgment that a fault has occurred, executes the process of replacing the slot of the slot change data with the slot of the spare system free of a fault. The slot of the operation system are replaced with that of the spare system based on the transmission-side operation system/spare system correspondence data stored in the storage unit 340. When a fault occurs in slot 2, for example, the particular slot is replaced with slot 1 (Case1). The transmission control unit 370 stores the slot change data after the process in the storage unit 340.

Now, the slot change process executed by the transmission control unit 370 is explained. The transmission control unit 370, by referring to the Slot Chg Tx setting data stored in the storage unit 340, extracts each ACM code from the place of the slot change data designated by the Slot Chg Tx setting data. The place (address) of the slot change data designated by the Slot Chg Tx setting data corresponds to each channel on output side, and the channels on input and output sides are set in correspondence with each other based on the particular address and the transmission-side ACM code stored in the place designated by the address.

Figures 12A, 12B:
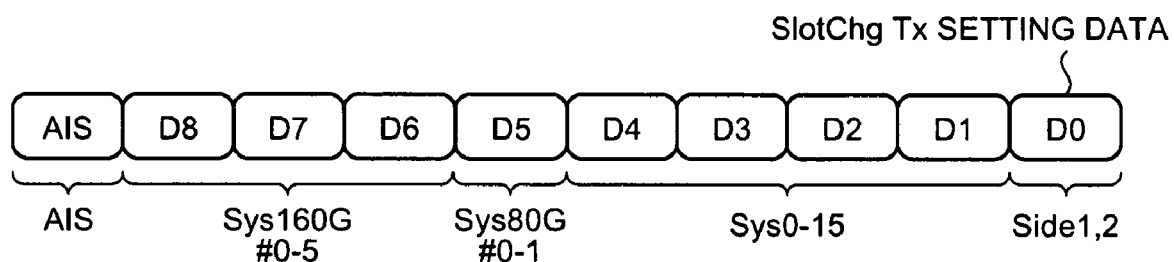
FIG. 12A is a diagram illustrating an example of the data structure of a Slot Chg Tx setting data.
FIG. 12B is a diagram illustrating the numerical values input to D0 to D8 of the Slot Chg Tx setting data and the correspondence between the numerical values and the positions of the corresponding ACM codes.

FIG. 12A is a diagram illustrating an example of the data structure of the Slot Chg Tx setting data. As illustrated in this drawing, the Slot Chg Tx setting data has an AIS and D0 to D8. Among them, the AIS stores the information indicating whether a fault has occurred in any slot or port. Also, D0 to D8 store the information for identifying the position of the ACM code on the slot change data stored in the storage unit 340.

FIG. 12B is a diagram illustrating the correspondence between the numerical values input to D0 to D8 of the Slot Chg Tx setting data and the position of the (input-side) ACM code corresponding to the numerical values (the information illustrated in FIG. 12B is assumed to be stored in the storage unit 340). When "xxx_0_00000" is set in Res and D0 to D8, for example, each ACM code identified by "Sys80#-Sys#0-Side1" in the slot change data stored in the storage unit 340 is extracted.

Then, from the transmission control unit 370, the input/output channel data, in which each ACM code extracted is set in correspondence with the output-side channel which in turn is set in correspondence with the Slot Chg Tx setting data illustrated in FIG. 12A in advance, is output to the switch control unit 260.

Figure 13:
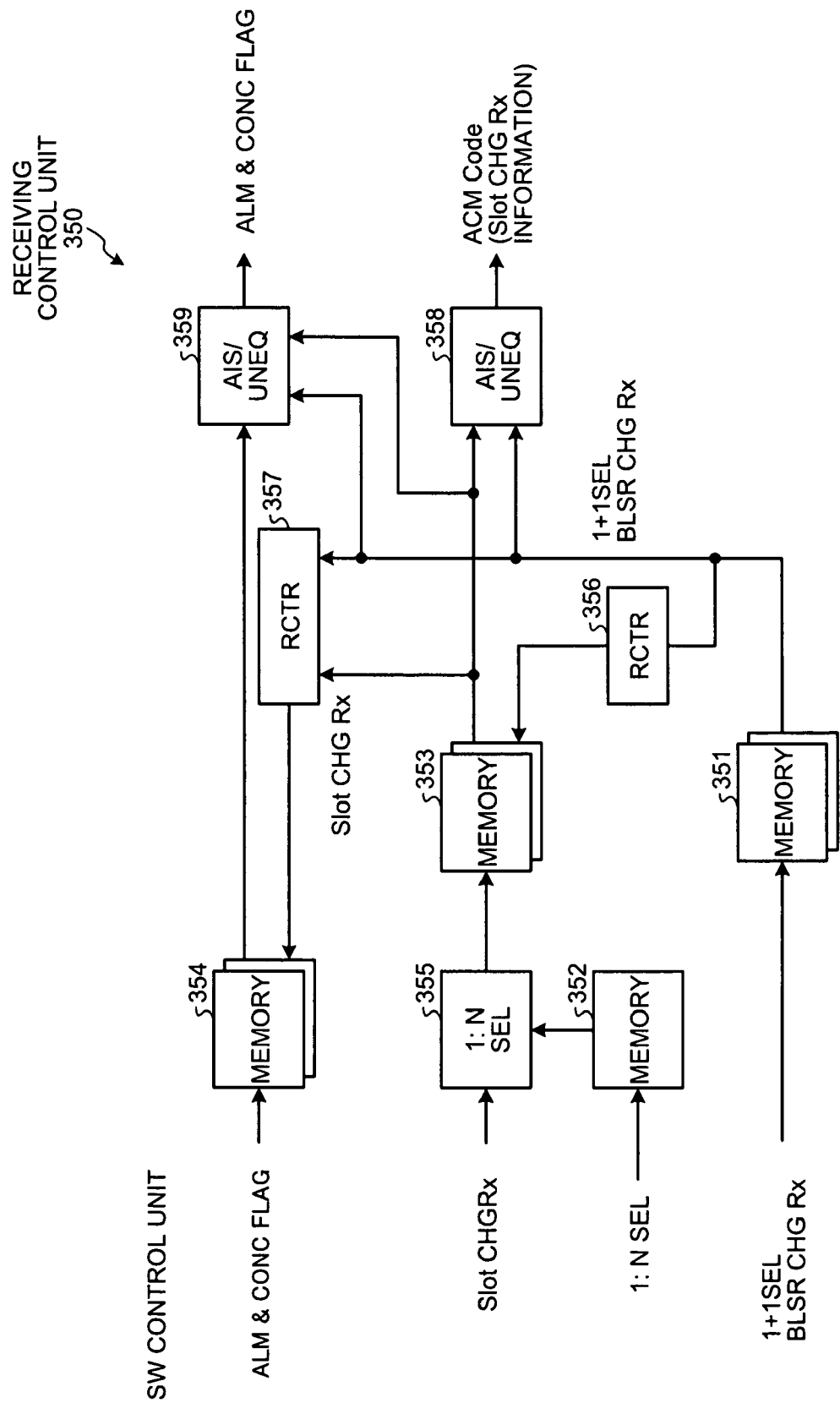
FIG. 13 is a function block diagram illustrating the configuration of a receiving control unit.

Next, a specific configuration of the receiving control unit 350 illustrated in FIG. 3 is explained. FIG. 13 is a function block diagram illustrating the configuration of the receiving control unit 350. As illustrated in this drawing, the receiving control unit 350 includes memories 351 to 354, a 1:N SEL 355, RCTRs 356, 357 and AIS/UNEQs 358, 359.

Among them, the memories 351 to 354 are for storing the various setting data. Specifically, the memory 351 stores the data indicating which slots are selected, the operation system or the spare system. The memory 352 stores the data of the slots of the spare system and the slots in which a fault has occurred. The memory 353 stores the data output from the 1:N SEL 355 and the data read by the RCTR 356. The memory 354 stores the data on the slots in which an error has occurred.

In the 1:N SEL 355 which acquires the Slot Chg Rx setting data (FIG. 5A), the slots contained in the Slot Chg Rx setting data are compared with the data stored in the memory 352, and among the slots contained in the Slot Chg Rx setting data, those in which a fault has occurred are replaced by the slots of the spare system.

The RCTR 356 is a processing unit which reads the data stored in the memory 351 and stores the read data in the memory 353. The RCTR 357 is a processing unit which reads the data stored in the memories 351, 353 and stores them in the memory 354.

The AIS/UNEQ 358 is a processing unit, which acquires the slots of the Slot Chg Rx setting data stored in the memory 353 and the data stored in the memory 351, and when the data stored in the memory 351 is for selecting the slots of the spare system, converts the slots contained in the Slot Chg Rx setting data to the slots of the spare system. Then, the AIS/UNEQ 358 generates the slot change data by extracting the ACM code corresponding to the Slot Chg Rx setting data.

The AIS/UNEQ 359 is a processing unit which reads the data stored in the memory 354 and adds each slot and a flag indicating whether a fault has occurred or not. Specifically, in the AIS/UNEQ 359, the data with a flag indicating a fault occurrence added thereto is output externally for the slots in which a fault has occurred, while the data with a flag indicating the fault occurrence not added thereto is output externally for the slots in which no fault has occurred.

Figure 14:
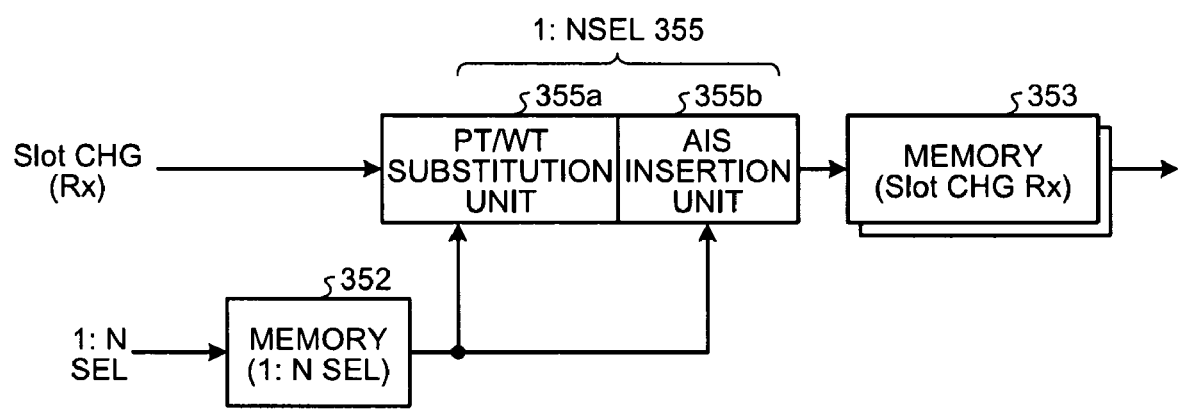
FIG. 14 is a diagram (1) for explaining the process of 1:N SEL.
Figure 15:
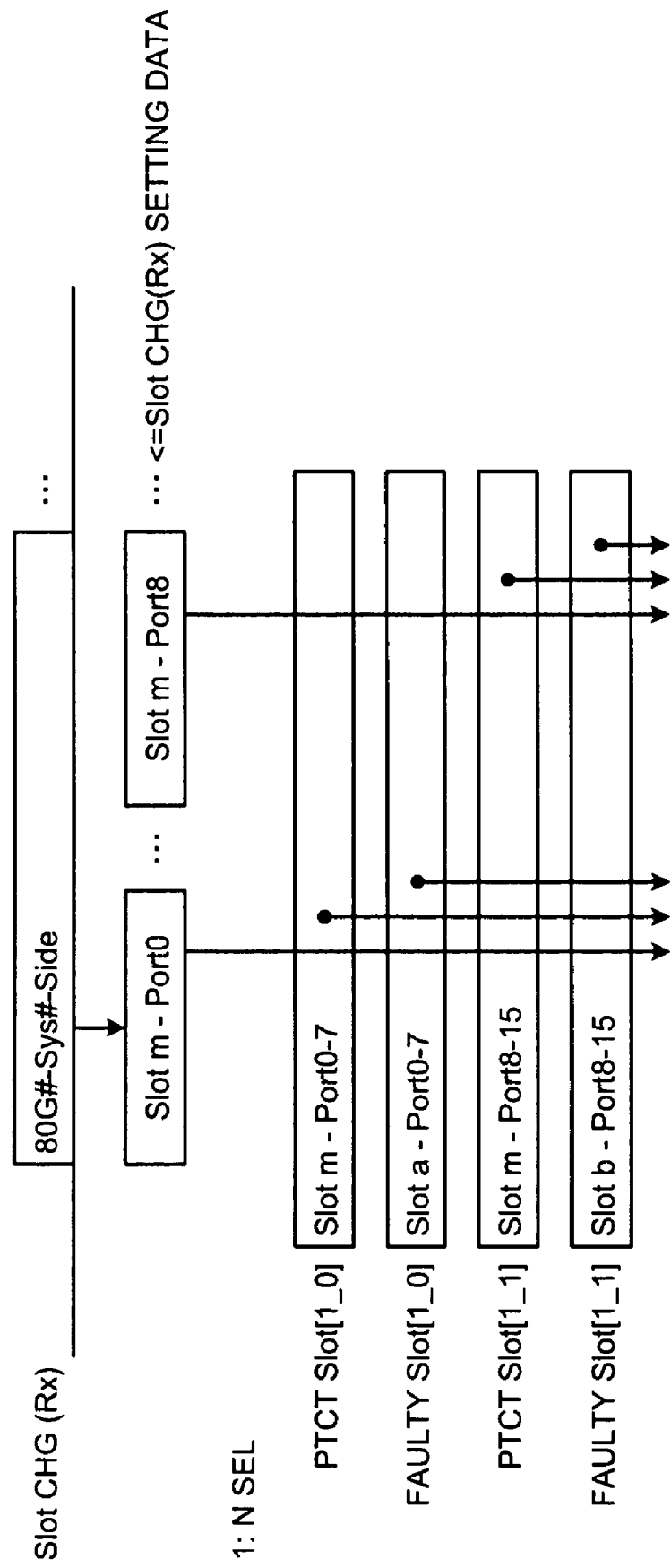
FIG. 15 is a diagram (2) for explaining the process of 1:N SEL.

Next, a specific process executed by the 1:N SEL 355 illustrated in FIG. 13 is explained. FIGS. 14 and 15 are diagrams for explaining the process executed by the 1:N SEL 355. As illustrated in FIG. 14, the 1:N SEL 355 includes a PT/WT substitution unit 355*a* and an AIS insertion unit 355*b*.

The PT/WT substitution unit 355*a* is a processing unit which converts the slots of the operation system contained in the Slot Chg Rx setting data to the slots of the spare system based on the information stored in the memory 352, and the AIS insertion unit 355*b* is a processing unit which inserts the AIS flag in the Slot Chg Rx setting data when the slots to be converted are already those of the spare system.

As illustrated in FIG. 15, when the slot "Slotm-Port0" is contained in the Slot Chg Rx setting data and this slot "Slotm-Port0" is identical with the slot "Slota-Port0-7" in which a fault has occurred, for example, then the slot "Slotm-Port0" of the Slot Chg Rex setting data is replaced by the slot "Slotm-Port0-7" of the spare system.

When the Slot Chg Rex setting data contains the slot "Slotm-Port0" and this slot "Slotm-Port0" is different from the slot "Slota-Port0-7" in which a fault has occurred, then the slots are not replaced.

Also, when the Slot Chg Rex setting data contains the slot "Slotm-Port0" and this slot "Slotm-Port0" is identical with the slot "Slotm-Port0-7" of the spare system, the AIS is added to the Slot Chg Rx setting data.

Figure 16:
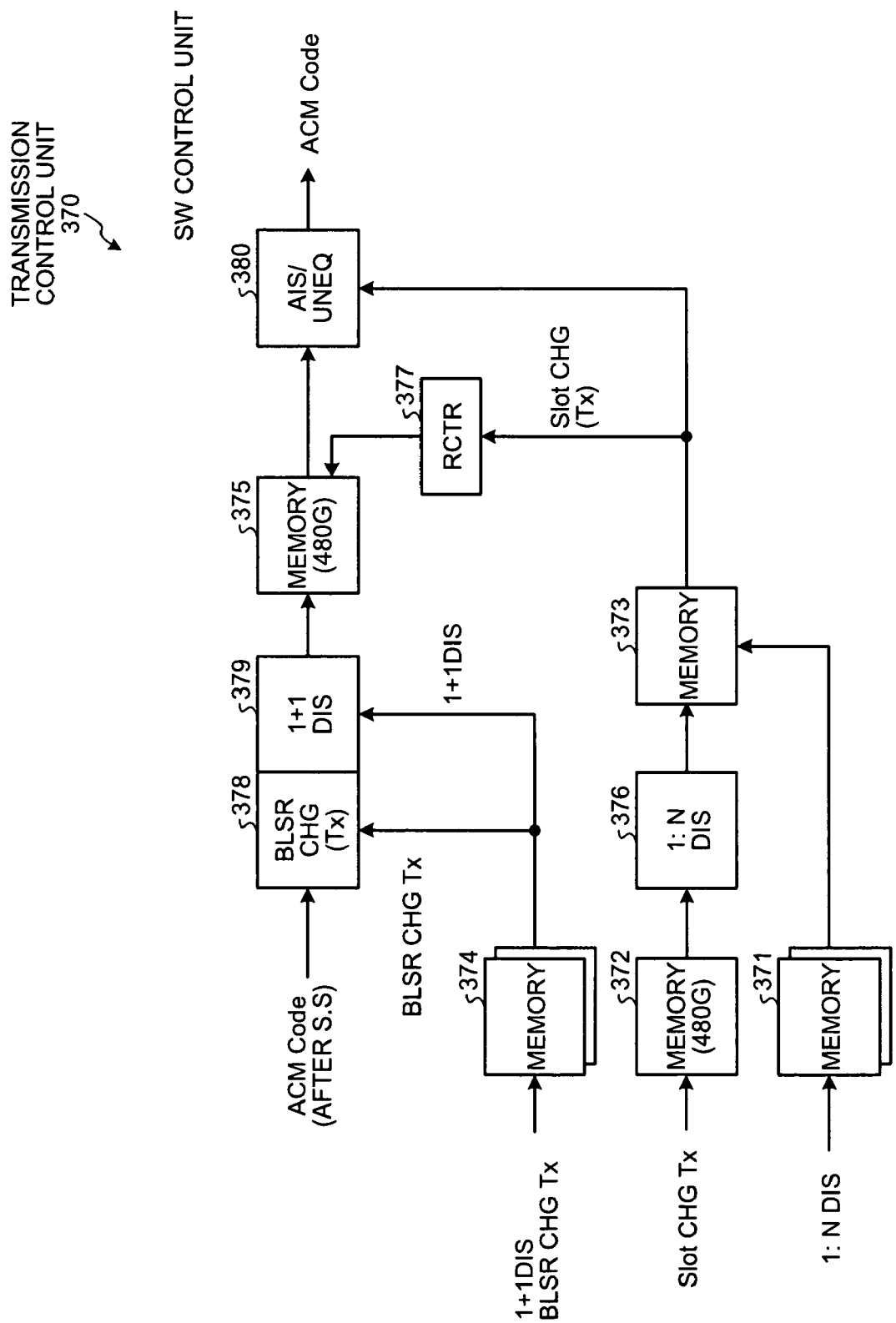
FIG. 16 is a function block diagram illustrating the configuration of a transmission control unit.

Next, a specific configuration of the transmission control unit 370 illustrated in FIG. 3 is explained. FIG. 16 is a function block diagram illustrating the configuration of the transmission control unit 370. As illustrated in this drawing, the transmission control unit 370 includes memories 371 to 375, a 1:N DIS 376, a RCTR 377, a BLSRCHG(Tx) 378, a 1+1 DIS 379 and an AIS/UNEQ 380.

Among these units, the memories 371 to 375 are for storing the various setting data. Specifically, the memory 371 stores the data of the slots of the spare system and the slots in which a fault has occurred. The memory 372 stores the Slot Chg Tx setting data (FIG. 12A). The memory 373 stores the data output from the 1:N DIS 376. The memory 374 stores a correspondence table for replacing the positions of the slot change data (right side in FIG. 10) and the data on the slots of the spare system in which a fault has occurred. The memory 375 stores the data output from the 1+1 DIS 379 and the RCTR 377.

The 1:N DIS 376 is a processing unit which acquires the Slot Chg Tx setting data from the memory 372, and based on the information stored in the memory 371, replaces those slots included in the acquired Slot Chg Rex setting data in which a fault has occurred, by the slots of the spare system.

The RCTR 377 is a processing unit which reads the data stored in the memory 373 and stores the read data in the memory 375. The BLSRCHG(Tx) 378 is a processing unit which acquires the slot change data and based on the correspondence table stored in the memory 374, replaces the position of the slot change data.

The 1+1 DIS 379 is a processing unit which acquires the slot change data and based on the information stored in the memory 374, replaces those slots included in the acquired slot change data in which a fault has occurred, with the slots of the spare system.

The AIS/UNEQ 380 is a processing unit which acquires the ACM code of the slot change data stored at the address designated by the Slot Chg Tx setting data stored in the memory 375 and which outputs, to the switch control unit 260, the input/output channel data with the ACM code set in correspondence with the output-side channel which in turn is set in correspondence with the Slot Chg Tx setting data in advance.

Figure 17:
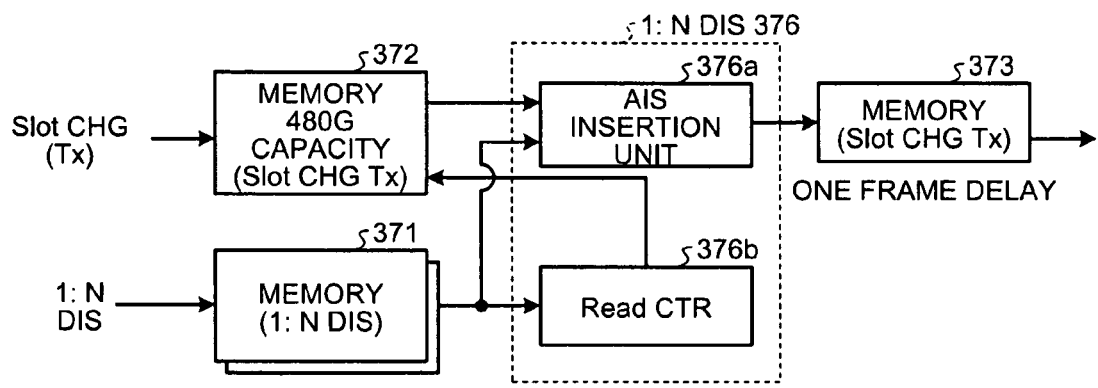
FIG. 17 is a diagram (1) for explaining the process of 1:N DIS.
Figure 18:
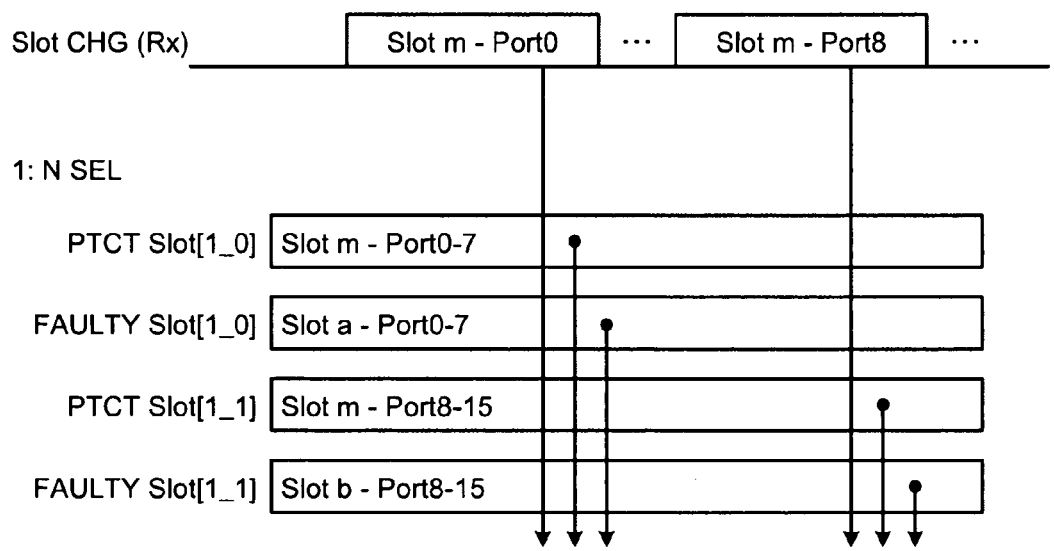
FIG. 18 is a diagram (2) for explaining the process of 1:N DIS.

Next, the specific process of the 1:N DIS 376 illustrated in FIG. 16 is explained. FIGS. 17 and 18 are diagrams for explaining the process executed by the 1:N DIS 376. As illustrated in FIG. 17, the 1:N DIS 376 includes an AIS insertion unit 376a and a read CTR 376b.

The AIS insertion unit 376a and the read CTR 376b collaborate with each other to convert the slots of the operation system contained in the Slot Chg Tx setting data into the slots of the spare system. When the slot to be converted is already that of the spare system, the AIS insertion unit 376a inserts the AIS flag into the Slot Chg Tx setting data.

As illustrated in FIG. 18, when the slot "Slotm-Port0" is contained in the Slot Chg Tx setting data and this slot "Slotm-Port0" is identical with the slot "Slota-Port0-7" in which a fault has occurred, for example, the slot "Slotm-Port0" of the Slot Chg Tx setting data is replaced by the slot "Slotm-Port0-7" of the spare system.

When the slot "Slotm-Port0" is contained in the Slot Chg Tx setting data and this slot "Slotm-Port0" is different from the slot "Slotm-Port0-7" in which a fault has occurred, on the other hand, the slots are not replaced.

Also, when the slot "Slotm-Port0" is contained in the Slot Chg Tx setting data and this slot "Slotm-Port0" is identical with the slot "Slotm-Port0-7" of the spare system, the AIS is added to the Slot Chg Tx setting data.

As described above, in the transmission apparatus 200 according to this embodiment, unlike in the conventional transmission apparatus 50, no protection switch is arranged on the signal path, but the TSI having only the basic function performs the function of the protection switch, and the processing unit for performing the switching function at a low rate is artificially constructed in the TSI, the switching process of SONET protection type (the switching process explained with reference to, for example, FIGS. 26 to 32) is virtually performed by the TSI, and the signal for controlling the TSI function is further controlled thereby to realize the protection switch function. Therefore, by deleting the logic of switching at the main signal rate in addition to the conventional TSI function, the circuit operating at a high speed is eliminated thereby to obviate the problem of power consumption.

The Rx-side process and the line select process by the receiving control unit 350 described above can be executed collectively by setting an Rx conversion table in advance. FIGS. 19 to 21 are diagrams illustrating an example of the Rx-side conversion table. When the BLSR change code is set to "00, 01" as illustrated on the first stage in FIG. 19 and the through mode is selected for the line select process of the receiving control unit 350, for example, the slot change data "Sys#0-Side1-(ch01 to 24)" is passed through as it is. When the slot of the spare system is selected for the line select process, on the other hand, the slot change data is changed to "Sys#0-Side2-(ch01 to 24)", and the slot to the one of the spare system. When the correspondence between the slot change data and the line select process is shaded as illustrated on the third stage of FIG. 19, the AIS (Alarm Indication Signal)-P (Path layer) process is executed and an error code is stored in the slot change data.

Also, when the BLSR change code is set to "10" and the through mode is selected for the line select process in the receiving control unit 350 as indicated on the first stage of FIG. 20, the slot change data "Sys#0-Side1-(ch01 to 24)" is passed through as it is. When the slot of the spare system is selected as the line select process, on the other hand, the slot change data is changed to "Sys#0-Side2-(ch01 to 24)" and the slot is changed to that of the spare system. When the correspondence between the slot change data and the line select process is shaded as illustrated on the third stage of FIG. 20, the AIS-S process is executed and an error code is stored in the slot change data.

Also, when the BLSR change code is set to "11" and the through mode is selected for the line select process in the receiving control unit 350 as indicated on the first stage of FIG. 21, the slot change data "Sys#0-Side1-(ch01 to 24)" is passed through as it is. When the slot of the spare system is selected by the line select process, on the other hand, the slot change data is changed to "Sys#0-Side2-(ch01 to 24)" and the slot is changed to that of the spare system. When the correspondence between the slot change data and the line select process is shaded as illustrated on the second stage of FIG. 21, the AIS-S process is executed and an error code is stored in the slot change data.

In similar fashion, the Tx-side process and the line select process by the transmission control unit 370 described above can be executed collectively by setting a Tx conversion table in advance. FIGS. 22 to 24 are diagrams illustrating an example of the Tx-side conversion table. As illustrated on the first stage in FIG. 22, for example, assume that the BLSR change code is set to "00, 01" and the through mode is selected as the line select process in the transmission control unit 370. The slot change data "Sys#0-Side1-(ch01 to 24)" is passed through as it is. When the slot of the spare system is selected for the line select process, on the other hand, the slot change data is also changed to "Sys#0-Side1-(ch01 to 24)". When the correspondence between the slot change data and the line select process is shaded as illustrated on the third stage of FIG. 22, the 1+1 DIS selects the slot of the operation system.

Also, when the BLSR change code is set to "10" and the through mode is selected as the line select process in the transmission control unit 370 as indicated on the first stage of FIG. 23, the slot change data "Sys#0-Side1-(ch01 to 24)" is passed through as it is. Also when the slot of the spare system is selected as the line select process, on the other hand, the slot change data is changed to "Sys#0-Side1-(ch01 to 24)". When the correspondence between the slot change data and the line select process is shaded as illustrated on the third stage of FIG. 23, the 1+1 DIS process selects the slot of the operation system.

Also, when the BLSR change code is set to "11" and the through mode is selected as the line select process in the transmission control unit 370 as indicated on the first stage of FIG. 24, the slot change data "Sys#0-Side1-(ch01 to 24)" is passed through as it is. Also, when the slot of the spare system is selected as the line select process, on the other hand, the slot change data is changed to "Sys#0-Side1-(ch01 to 24)". When the correspondence between the slot change data and the line select process is shaded as illustrated on the second stage of FIG. 24, the 1+1 DIS process selects the slot of the operation system.

In accordance with an embodiment of the present invention, there is provided a transmission apparatus in which a transmission path for an optical signal input from an optical network making up a redundant configuration is switched by controlling a cross connect switch thereby to transmit the optical signal, wherein the cross connect (TSI) has input slots for inputting the optical signal and output slots for outputting the optical signal, wherein the input/output correspondence information on the correspondence between the input and output slots are stored in accordance with the redundant configuration, and wherein the input and output slots of the cross connect switch are set in correspondence with each other based on the input/output correspondence information in store. In this way, a virtual protection switch can be realized on the TSI and the processing load imposed on the setting of various lines of the transmission apparatus is reduced, thereby preventing the increase in circuit size.

Also, in accordance with an embodiment of the present invention, the optical network having the redundant configuration further stores the operation/spare system slot information indicating the correspondence between the input/output slots included in the transmission path for the operation system and the input/output slots included in the transmission path of the spare system. Upon occurrence of a fault in the input or output slot contained in the input/output correspondence information, therefore, the faulty slot is replaced by a slot of the spare system based on the operation/spare system slot information. As a result, a measure can be efficiently taken against a fault on the optical network.

Also, in accordance with an embodiment of the present invention, the input and output slots of the cross connect each include plural channels, and by setting each channel of the input slot in correspondence with each channel of the output slot, the transmission path for the optical signal is switched. Thus, the transmission path can be switched for each channel.

Also, in accordance with an embodiment of the present invention, the information on the correspondence between the input and output slots is stored in accordance with the redundant configuration of various (1:N, 1+1, ring network) types, and based on this information, the cross connect is switched. Therefore, a virtual protection switch corresponding to the information structure of each type can be realized on the cross connect, thereby suppressing the increase in circuit size.

Also, in accordance with an embodiment of the present invention, a correspondence table defining the correspondence between the channel of the input slot and the channel of the output slot is further stored based on the relation between the redundant configuration of 1+1 type and the redundant configuration of ring network type, and by using this correspondence table, the channels of the input and output slots are set in correspondence with each other. As a result, the process can be simplified and the circuit size of the transmission apparatus prevented from increasing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A transmission apparatus, comprising:
  a cross connect switch that switches a transmission path for an optical signal input from an optical network making up a redundant configuration and that includes an input slot to which the optical signal is input and an output slot from which the optical signal is output;
  a storage unit that stores input/output correspondence information where the input slot and the output slot are set in correspondence with each other in accordance with the redundant configuration;
  a processing unit that generates connection information where the input slot and the output slot of the cross connect switch are set in correspondence with each other based on the input/output correspondence information stored in the storage unit, setting information of a plurality of applications and identification information of the input slot and the output slot of the cross connect switch; and
  a transmission path switching unit that switches the transmission path for the optical signal by setting the input slot and the output slot of the cross connect switch in correspondence with each other based on the connection information generated in the processing unit.
2. The transmission apparatus according to claim 1, wherein the storage unit further stores operation/spare system slot information, the operation/spare system slot information indicating the correspondence between the input and output slots contained in the transmission path for an operation system and the input and output slots contained in the transmission path of a spare system in an optical network making up the redundant configuration, the transmission apparatus further comprising a slot change unit that upon occurrence of a fault in the input slot or the output slot contained in the input/output correspondence information, replaces the faulty slot with a slot of the spare system based on the operation/spare system slot information.

3. The transmission apparatus according to claim 2, wherein each of the input slot and the output slot includes a plurality of channels, and the transmission path switching unit switches the transmission path for the optical signal by setting each channel of the input slot and each channel of the output slot in correspondence with each other.

4. The transmission apparatus according to claim 3, wherein the input/output correspondence information is information where the input slot and the output slot are set in correspondence with each other in accordance with a redundant configuration of 1:N type.

5. The transmission apparatus according to claim 4, wherein the input/output correspondence information is information where the input slot and the output slot are set in correspondence with each other in accordance with a redundant configuration of 1+1 type.

6. The transmission apparatus according to claim 5, wherein the input/output correspondence information is information where the input slot and the output slot are set in correspondence with each other in accordance with an information configuration of ring network type.

7. The transmission apparatus according to claim 6, wherein the storage unit further stores a correspondence table for setting the channel of the input slot and the channel of the output slot in correspondence with each other based on a relation between the redundant configuration of 1+1 type and the redundant configuration of ring network type, and the transmission path switching unit sets the channel of the input slot and the channel of the output slot in correspondence with each other using the correspondence table.

* * * * *